(12) United States Patent
Leidner et al.

(10) Patent No.: US 10,733,380 B2
(45) Date of Patent: Aug. 4, 2020

(54) NEURAL PARAPHRASE GENERATOR

(71) Applicant: Thomson Reuters Global Resources Unlimited Company, Baar (CH)

(72) Inventors: Jochen L. Leidner, London (GB); Vasileios Plachouras, London (GB); Fabio Petroni, London (GB)

(73) Assignee: THOMSON REUTERS ENTERPRISE CENTER GMBH, Zug (CH)

(*) Notice: Subject to any disclaimer, the term of this patent is extended or adjusted under 35 U.S.C. 154(b) by 72 days.

(21) Appl. No.: 15/979,310

(22) Filed: May 14, 2018

(65) Prior Publication Data
US 2018/0329883 A1 Nov. 15, 2018

Related U.S. Application Data

(60) Provisional application No. 62/506,223, filed on May 15, 2017.

(51) Int. Cl.
*G06F 17/27* (2006.01)
*G06F 17/30* (2006.01)
(Continued)

(52) U.S. Cl.
CPC ........ *G06F 40/289* (2020.01); *G06F 16/2237* (2019.01); *G06F 16/3347* (2019.01);
(Continued)

(58) Field of Classification Search
CPC ............ G06F 17/2775; G06F 17/2881; G06F 17/2795; G06F 17/2785; G06F 16/3347;
(Continued)

(56) References Cited

U.S. PATENT DOCUMENTS

| | | | |
|---|---|---|---|
| 6,721,706 B1 * | 4/2004 | Strubbe | G10L 15/18 704/257 |
| 6,728,679 B1 * | 4/2004 | Strubbe | G06F 3/011 704/270.1 |

(Continued)

OTHER PUBLICATIONS

Ziqiang Cao et al: Joint Copying and Restricted Generation for Paraphrase, Arxiv.org, Cornell University Library. 201, Olin Library Cornell University Ithaca, NY 14853. Nov. 28, 2016 (Nov. 28, 2016). XP080735161, abstract, Introduction, Background: Seq2Seq Models and Attention, Mechanism, Method.

(Continued)

*Primary Examiner* — Edwin S Leland, III
(74) *Attorney, Agent, or Firm* — Duncan Galloway Egan Greenwald, PLLC; Kevin T. Duncan

(57) ABSTRACT

A neural paraphrase generator receives a sequence of tuples comprising a source sequence of words, each tuple comprising word data element and structured tag element representing a linguistic attribute about the word data element. An RNN encoder receives a sequence of vectors representing a source sequence of words, and RNN decoder predicts a probability of a target sequence of words representing a target output sentence based on a recurrent state in the decoder. An input composition component includes a word embedding matrix and a tag embedding matrix, and receives and transforms the input sequence of tuples into a sequence of vectors by 1) mapping word data elements to word embedding matrix to generate word vectors, 2) mapping structured tag elements to tag embedding matrix to generate tag vectors, and 3) concatenating word vectors and tag vectors. An output decomposition component outputs a target sequence of tuples representing predicted words and structured tag elements, the probability of each single tuple from the output is predicted based on a recurrent state of the decoder.

20 Claims, 14 Drawing Sheets

(51) Int. Cl.
*G06F 17/28* (2006.01)
*G06F 17/21* (2006.01)
*G06N 3/04* (2006.01)
*G06F 17/18* (2006.01)
*G06F 40/289* (2020.01)
*G06F 16/22* (2019.01)
*G06F 16/33* (2019.01)
*G06N 3/08* (2006.01)
*G06N 5/02* (2006.01)
*G06F 40/30* (2020.01)
*G06F 40/56* (2020.01)
*G06F 40/58* (2020.01)
*G06F 40/117* (2020.01)
*G06F 40/247* (2020.01)

(52) U.S. Cl.
CPC ............ *G06F 17/18* (2013.01); *G06F 40/117* (2020.01); *G06F 40/247* (2020.01); *G06F 40/30* (2020.01); *G06F 40/56* (2020.01); *G06F 40/58* (2020.01); *G06N 3/04* (2013.01); *G06N 3/0445* (2013.01); *G06N 3/0454* (2013.01); *G06N 3/082* (2013.01); *G06N 5/022* (2013.01)

(58) Field of Classification Search
CPC .... G06F 16/2237; G06F 17/218; G06F 17/18; G06F 17/289; G06N 3/0454; G06N 3/0445; G06N 5/022; G06N 3/082; G06N 3/04
USPC .............................................................. 704/9
See application file for complete search history.

(56) References Cited

U.S. PATENT DOCUMENTS

| 6,731,307 | B1* | 5/2004 | Strubbe | G06N 3/004 704/E17.002 |
| 6,795,808 | B1* | 9/2004 | Strubbe | G10L 15/1822 704/275 |
| 8,280,719 | B2* | 10/2012 | Miller | G06F 17/278 704/9 |
| 9,830,315 | B1* | 11/2017 | Xiao | G06F 17/2785 |
| 10,437,936 | B2* | 10/2019 | DeFelice | G06F 17/2785 |
| 2007/0179777 | A1* | 8/2007 | Gupta | G06F 17/27 704/9 |
| 2009/0222395 | A1* | 9/2009 | Light | G06F 17/278 706/47 |
| 2009/0327115 | A1* | 12/2009 | Schilder | G06F 17/278 705/35 |
| 2012/0036130 | A1* | 2/2012 | Light | G06F 17/278 707/736 |
| 2014/0040312 | A1* | 2/2014 | Gorman | G06F 17/2785 707/771 |
| 2015/0186504 | A1* | 7/2015 | Gorman | G06F 16/24522 707/752 |
| 2015/0286747 | A1* | 10/2015 | Anastasakos | G06F 16/9017 707/776 |
| 2017/0185590 | A1* | 6/2017 | Tetreault | G06F 17/2264 |
| 2017/0185591 | A1* | 6/2017 | Tetreault | G06F 17/274 |
| 2018/0114522 | A1* | 4/2018 | Hall | G10L 13/047 |
| 2018/0285186 | A1* | 10/2018 | Godefroid | G06F 11/0751 |
| 2018/0329987 | A1* | 11/2018 | Tata | G06F 17/271 |
| 2019/0205383 | A1* | 7/2019 | Martineau | G06F 17/241 |

OTHER PUBLICATIONS

Sadid A Hasan et al: Neural Clinical Paraphrase Generation with Attention, Proceedings of the Clinical Natural Language Processing Workshop, Dec. 17, 2016 (Dec. 17, 2016), pp. 42-53, XP055354907, Retrieved from the Internet: URL:https://aclweb.org/anthology/W/W16/W16-4207.pdf [retrieved on Mar. 15, 2017], cited in the application, abstract, 1. Introduction, 3. Model Description.

Aaditya Prakash et al: Neural Paraphrase Generation with Stacked Residual LSTM Networks, Oct. 13, 2016 (Oct. 13, 2016), XP055454067, Retrieved from the Internet: URL:https://arxiv.org/pdf/1610.03098.pdf [retrieved on Feb. 23, 2018], cited in the application, the whole document.

\* cited by examiner

FIGURE 13

NEURAL PARAPHRASE GENERATOR

CROSS REFERENCE TO RELATED APPLICATION

The present application claims benefit of priority to U.S. Provisional Application No. 62/506,223 filed May 15, 2017, entitled NEURAL PARAPHRASE, the entirety of which is hereby incorporated herein by reference.

FIELD OF THE INVENTION

This invention generally relates to the field of Natural Language Processing (NLP) and Information Retrieval (IR) for mining and intelligent processing of data collected from content sources and reformulation of such data for use in a variety of applications and environments. More specifically, this invention relates to use of neural machine translation techniques for generating paraphrases of collected textual data.

BACKGROUND OF THE INVENTION

The variability of human languages poses a challenge to human-machine communication: different forms correspond to and may approximate the same meaning. For example, a question answering system capable of answering the question "The GDP of which country has risen steadily since 2012?" might fail in answering the question "Which country's GDP has continued to increase since 2012?" although to humans, these two are obviously similar. The fields of paraphrase mining (extracting of equivalent pairs from text) and paraphrase generation (generating paraphrase pairs based on rules or machine learning models) have tried to address this challenge.

Generating and identifying paraphrases is an important part of a large number of Natural Language Processing (NLP) tasks, due to the variability of language. Indeed, NLP systems must be able to handle this variability as users can express the same or similar concepts in a number of different ways. Inspired by the success of neural machine translation, there has been a number of studies investigating the effectiveness of sequence-to-sequence models for paraphrase generation. The focus of these works has been the exploration of different neural network architectures, using multiple layers of recurrent cells, using residual connections between layers, and drop-out.

Many NLP tasks, including automatic question answering and summarization or text generation, can benefit from the recognition or generation of paraphrases. For example, we can answer "How hot is it in Singapore in fall?" if we can relate it to the question "What is the temperature in Singapore in autumn?" and the answer to the latter is known. In a dialogue system, generating paraphrases of the system utterances may lead to more natural interaction. Recently, neural machine translation techniques based on sequence-to-sequence (seq2seq) models have been applied to the task of paraphrase generation with promising results.

Paraphrases are phrases or sentences that use different words or syntax to express the same or similar meaning (Rahul Bhagat and Eduard Hovy. 2013. *What Is a Paraphrase? Computational Linguistics* 39 (2013), 463-472. Issue 3.). Given the variability of language, generating paraphrases for an input phrase or sentence is an important part of a number of Natural Language Processing (NLP) and Information Retrieval (IR) tasks. For example, if we can identify that a question submitted to a Question Answering (QA) system is a paraphrase of another question with known answer, then the QA system can answer the first question as well. In the context of automatic query expansion, paraphrases can be used as alternative query reformulations (Karen Spärck Jones and John I. Tait. 1984. *Automatic Search Term Variant Generation. Journal of Documentation* 40, 1 (1984), 50-66.). Madnani and Dorr provide an overview of data-driven paraphrase generation (Nitin Madnani and Bonnie J. Dorr. 2010. *Generating Phrasal and Sentential Paraphrases: A Survey of Data-driven Methods. Comput. Linguist.* 36, 3 (2010), 341-387.).

One approach to paraphrase generation is to consider it as a monolingual translation task, where an input phrase is translated to its paraphrases. (Chris Quirk, Chris Brockett, and William B. Dolan. 2004. *Monolingual Machine Translation for Paraphrase Generation. In Proceedings of the 2004 Conference on Empirical Methods in Natural Language Processing (EMNLP '04).* 142-149. Sander Wubben, Antal van den Bosch, and Emiel Krahmer. 2010. *Paraphrase Generation As Monolingual Translation: Data and Evaluation. In Proceedings of the 6th International Natural Language Generation Conference (INLG '10).* 203-207.) Since the recent advances in neural machine translation and sequence-to-sequence models (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).* Ilya Sutskever, Oriol Vinyals, and Quoc V. Le. 2014. *Sequence to Sequence Learning with Neural Networks. In Proceedings of the 27th International Conference on Neural Information Processing Systems (NIPS '14).* 3104-3112.), there has been a number of works where neural machine translation models have been applied to the task of paraphrase generation (Sadid A. Hasan, Bo Liu, Joey Liu, Ashequl Qadir, Kathy Lee, Vivek Datla, Aaditya Prakash, and Oladimeji Farri. 2016. *Neural Clinical Paraphrase Generation with Attention. In Proceedings of the Clinical Natural Language Processing Workshop (ClinicalNLP).* 42-53. Jonathan Mallinson, Rico Sennrich, and Mirella Lapata. 2017. *Paraphrasing Revisited with Neural Machine Translation. In Proceedings of the 15th Conference of the European Chapter of the Association for Computational Linguistics: Volume 1, Long Papers (EACL '17).* 881-893. Aaditya Prakash, A. Hasan, Sadid, Kathy Lee, Vivek Datla, Ashequl Qadir, Joey Liu, and Oladimeji Farry. 2016. *Neural Paraphrase Generation with Stacked Residual LSTM Networks. In Proceedings of the 26th International Conference on Computational Linguistics: Technical Papers (COLING '16).* 2923-2934.). However, a shortcoming of these works is they have focused on exploring alternative neural network configurations and have only employed the surface form of words, ignoring any syntactic information, such as Part-of-Speech (POS) tags.

Accordingly, one key problem associated with these approaches is that they have only relied on words, ignoring any syntactic information, such as Part-of-Speech (POS) tags, grammatical functions, or named entities. Existing models only incorporate word strings and ignore linguistic meta-data.

Mining and Generating Paraphrases. Lin and Pantel (Dekang Lin and Patrick Pantel. 2001. *DIRT—Discovery of Inference Rules from Text. In Proceedings of the Seventh ACM SIGKDD International Conference on Knowledge Discovery and Data Mining (KDD '01).* 323-328.) described DIRT (Discovery of Inference Rules from Text), a method to mine paraphrase pairs, which they called inference rules, from text using a dependency representation. Sentences are parsed using Lin's rule-based Minipar parser, and the near meaning equivalence of two phrases is then established via a similarity comparison of their dependency paths and using mutual information. Lin and Pantel's work was the first theory-agnostic, large-scale attempt to extract paraphrase pairs.

Pasça and Dienes (Marius Paşca and Péter Dienes. 2005. *Aligning Needles in a Haystack: Paraphrase Acquisition Across the Web. In Proceedings of the Second International Joint Conference on Natural Language Processing (IJCNLP '05).* 119-130.) presented a method for mining paraphrases from a Web crawl by aligning n-gram fragments bounded by shared anchor n-grams on either side. The method is notable for working with noisy input text, for not requiring a parallel corpus, and for relying only on a sentence splitter and a POS tagger. The length of the fixed anchors on either side determine the specificity of the extracted paraphrases. From a crawl of 972 m Web pages, depending on settings between 13.9 k and 41.7 m paraphrase pairs are extracted. The precision of paraphrases was not evaluated for a random sample in a component-based evaluation as one would expect; instead, the top-100, middle 100 and bottom 100 paraphrases of a run were evaluated. An additional task-based evaluation on date related questions from the TREC QA track showed 10-20 points of improvements in mean reciprocal rank of the correct answer.

The RTE (Recognizing Textual Entailment) shared task held seven times to date first as part of the PASCAL initiative and now as part of the Text Analysis Conference (TAC) has investigated the efficacy of the research question of entailment recognition based on short text fragments (Ido Dagan, Oren Glickman, and Bernardo Magnini. 2006. *The PASCAL Recognising Textual Entailment Challenge. In Proceedings of the 1st International Conference on Machine Learning Challenges: Evaluating Predictive Uncertainty Visual Object Classification, and Recognizing Textual Entailment (MLCW '05).* 177-190.). Entailment can be seen as a unidirectional version of the paraphrase relation. Zhao, Wang and Liue (Shiqi Zhao, HaifengWang, and Ting Liu. 2010. *Paraphrasing with Search Engine Query Logs. In Proceedings of the 23rd International Conference on Computational Linguistics (COLING '10).* 1317-1325.) described one of the earliest attempts to mine paraphrases from search query logs. Biran, Blevins and McKeown mined templatized (i.e., slightly abstracted) sentential paraphrase sets with typed variable slots) from plain text. Madnani and Dorr (Nitin Madnani and Bonnie J. Dorr. 2010. *Generating Phrasal and Sentential Paraphrases: A Survey of Data-driven Methods. Comput. Linguist.* 36, 3 (2010), 341-387.). provided a survey of techniques for generating paraphrases from data. Androutsopoulos and Malakasiotis also survey methods for paraphrasing and textual entailment recognition, generation and extraction. More recently, Yin et al. modelled sentence pairs with an attention-based Convolutional Neural Network (AB-CNN). The three models are utilized in the tasks of Answer Selection (AS) in question answering, paraphrase identification (PI) and textual entailment (TE).

Paraphrasing as Machine Translation. In the context of machine translation, there have been attempts to extract paraphrase pairs from parallel corpora or other translation pairs. Quirk, Brockett and Dolan (Chris Quirk, Chris Brockett, and William B. Dolan. 2004. *Monolingual Machine Translation for Paraphrase Generation. In Proceedings of the 2004 Conference on Empirical Methods in Natural Language Processing (EMNLP '04).* 142-149.) investigated the use of statistical machine translation to generate new paraphrases for input sentences, based on a large number of aligned sentence pairs extracted from news articles on the Web. Bannard and Callison-Burch (Colin Bannard and Chris Callison-Burch. 2005. *Paraphrasing with Bilingual Parallel Corpora. In Proceedings of the 43rd Annual Meeting on Association for Computational Linguistics (ACL '05).* 597-604.) extracted paraphrases from a bilingual parallel corpus by treating paraphrases as pairs of phrases in one language that are aligned with the same phrase in the second language. In the context of Natural Language Generation (NLG), Wubben, Van Den Bosch and Krahmer generated sentential paraphrases using statistical machine translation trained on a corpus of news headlines and demonstrated improved performance compared to a word substitution method.

Encoder-Decoder Models. The introduction of encoder-decoder models to machine translation has led to important improvements in the quality of machine translation. The basic idea of encoder-decoder models is that the decoder, which corresponds to a neural language model, generates the output sequence starting from an initial state that corresponds to the hidden state of the encoder, which has processed the input sequence. Kalchbrenner and Blunsom (Nal Kalchbrenner and Phil Blunsom. 2013. *Recurrent Continuous Translation Models. In Proceedings of the 2013 Conference on Empirical Methods in Natural Language Processing (EMNLP '13).* 1700-1709.) introduced a model where the encoder and the decoder were a convolutional neural network and a recurrent neural network, respectively. Sutskever, Vinyals and Le (Ilya Sutskever, Oriol Vinyals, and Quoc V. Le. 2014. *Sequence to Sequence Learning with Neural Networks. In Proceedings of the 27th International Conference on Neural Information Processing Systems (NIPS' 14).* 3104-3112.) introduced the sequence-to-sequence model, which uses for both the encoder and decoder a recurrent neural network with LSTM units. They also found that reversing the input led to improved performance, possibly due to the close alignment between source and target languages in the machine translation task they evaluated the model on (translating French to English). As a result, the initial words in the input sequence can have a higher impact on the encoder's hidden state, which is then used to condition the decoder's generated sequence. Bandanau, Cho and Bengio (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).*) used a bi-directional RNN to model the encoder, and introduce an attention mechanism, which generates one vector representation for each word in the input sequence, instead of encoding the whole input with just one vector. Luong, Pham and Manning refined the idea of attention by computing attention from a window of words, instead of using all of the input words, and concatenate the attention vectors with the hidden state vectors of the decoder before predicting the words of the output sequence. Neubig (Graham Neubig. 2017. *Neural Machine Translation and Sequence-to-sequence Models: A Tutorial. arXiv preprint arXiv:* 1703.01619 (2017). offered a recent and comprehensive overview of sequence-to-sequence models for machine translation.

Neural machine translation models have also been applied to the task of paraphrase generation. Hasan et al. (Sadid A. Hasan, Bo Liu, Joey Liu, Ashequl Qadir, Kathy Lee, Vivek Datla, Aaditya Prakash, and Oladimeji Farri. 2016. *Neural Clinical Paraphrase Generation with Attention. In Proceedings of the Clinical Natural Language Processing Workshop (ClinicalNLP).* 42-53.) used a bi-directional RNN for encoding and a RNN for decoding paraphrases, with the attention mechanism by Bandanau, Cho and Bengio (*Translation by Jointly Learning to Align and Translate. In Proceedings of the International Conference on Learning Representations (ICLR).* They also represented input and output as sequences of characters, instead of word sequences. Prakash et al. (Aaditya Prakash, A. Hasan, Sadid, Kathy Lee, Vivek Datla, Ashequl Qadir, Joey Liu, and Oladimeji Farry. 2016. *Neural Paraphrase Generation with Stacked Residual LSTM Networks. In Proceedings of the 26th International Conference on Computational Linguistics: Technical Papers (COLING '16). 2923-2934.).* used a similar architecture with more layers and residual connections, where the input of one layer is also made available to the above layer. Mallinson, Sennrich and Lapata (Jonathan Mallinson, Rico Sennrich, and Mirella Lapata. 2017. *Paraphrasing Revisited with Neural Machine Translation. In Proceedings of the 15th Conference of the European Chapter of the Association for Computational Linguistics: Volume 1, Long Papers (EACL '17). 881-893.)* applied the bilingual pivoting approach proposed by Bannard and Callison-Burch (Cohn Bannard and Chris Callison-Burch. 2005. *Paraphrasing with Bilingual Parallel Corpora. In Proceedings of the 43rd Annual Meeting on Association for Computational Linguistics (ACL '05). 597-604.)* with neural machine translation, where the input sequence is mapped to a number of translations in different languages, and then these translations are mapped back to the original language. One key shortcoming to all these approaches is that none of these works used additional linguistic information, such as POS tags to enhance the quality of generated paraphrases. An additional problem is the encoder-decoder models used randomly initialized embeddings.

What is needed is a system adapted to consider and synthesize syntactic information, such as linguistic or Part-of-Speech (POS) tags, grammatical functions, or named entities, in conjunction with neural network architectures to improve performance, especially in connection with paraphrase generation. A system is needed that will use pre-trained values to populate one or more embedding matrix at initialization.

SUMMARY OF THE INVENTION

The present invention provides technical solutions for use in solving the afore-mentioned problems prevalent in the field of paraphrase generation in conjunction with neural networks. The present inventive approach to paraphrase generation as a neural machine translation task involves first translating a source phrase (encoder/decoder input stage, e.g., input as source sequence of tuples) to a target phrase (output decomposition stage, e.g., output as target sequence of tuples) with similar meaning. A problem with existing neural machine translation models used for paraphrase generation is that they employ only words and ignore additional information, such as Part-of-Speech tags. The present invention improves upon existing neural machine translation systems by, among other things, providing a novel paraphrase generator model based on sequence-to-sequence (seq2seq or s2s) models with integration of both words and other linguistic information, such as linguistic or Part-of-Speech (POS) tag information.

POS tags are labels assigned to words or tokens in a corpus, e.g., text corpus, that indicate a part of speech known to be related to the word or token. POS tags or labels may refer to grammatical elements or categories of words such as noun, verb, adjective, adverb, tense (present/past/future), number (plural/singular), etc. A POS tagset is a set of POS tags used to label words or tokens in the corpus. Tagsets may be language specific, e.g., see Appendix. POS tagging is a useful technical tool enabling text processing systems to automatically differentiate based on POS. Due to the size and complexity of most corpora manual tagging is not feasible and certainly not efficient or effective.

Using words and linguistic information jointly can improve paraphrase generation; in particular, we show herein that a sequence-to-sequence model enhanced with part of speech (POS) tags outperforms a sequence-to-sequence model based only on words. Our experimental study on real-world data sets indicates that important gains can be obtained when POS tags are incorporated with the proposed model. This is the first attempt at a POS-informed neural paraphrasing model.

Our work is related to factored translation models (Philipp Koehn and Hieu Hoang. 2007. *Factored Translation Models. In Proceedings of the 2007 Joint Conference on Empirical Methods in Natural Language Processing and Computational Natural Language Learning (EMNLP-CoNLL). 868-876.),* from the field of statistical machine translation, where the input is defined as a sequence of factors, including words and other types of linguistic information.

The model disclosed herein introduces factors in neural network-based encoder-decoder models and redefines the loss function to consider the prediction of different types of linguistic information as part of the training process.

The present invention provides a novel sequence-to-sequence model which overcomes the limitations of existing models and allows us to employ both words and POS tag information for paraphrase generation. The input to our model is a sequence of tuples consisting of words and their corresponding POS tag. The encoder of the model, which is a bidirectional Recurrent Neural Network (RNN) with LSTM cells (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).* Sébastien Jean, Kyunghyun Cho, Roland Memisevic, and Yoshua Bengio. 2015. *On Using Very Large Target Vocabulary for Neural Machine Translation. In Proceedings of the 53rd Annual Meeting of the Association for Computational Linguistics and the 7th International Joint Conference on Natural Language Processing (Volume 1: Long Papers). 1-10.* Minh-Thang Luong, Hieu Pham, and Christopher D Manning. 2015. *Effective approaches to attention-based neural machine translation. arXiv preprint arXiv: 1508.04025 (2015).),* learns a state vector for each word and POS tuple in the input. The decoder predicts the probability of a target token and POS tag based on the previous target tuples of words and POS tags, the state of the decoder's RNN and the output of an attention mechanism which calculates the weighted average of the encoder's states. The loss function we use for training the model is the sum of two terms taking into account the predicted words and POS tags, respectively. The proposed model learns to jointly generate a sequence of words and POS tags. In this way, the prediction of POS tags for the generated paraphrases informs the selection of words, leading to improved performance, while at the same time, reducing the total number of model parameters.

In one exemplary manner, PPDB 2.0 (a large scale automatically mined data set of paraphrases) and COCO (an image captioning data set) were used to confirm use of the invention to extend RNN encoder-decoder models with POS tag information. The invention extends sequence-to-sequence models with POS tag information. In addition, we define a loss function for jointly learning to predict tuples of words and POS tags. Testing confirmed the inventive model, trained on both words and POS tags, consistently outperforms models which use only words according to both BLEU score (Kishore Papineni, Salim Roukos, Todd Ward, and Wei-Jing Zhu. 2002. *BLEU: A Method for Automatic Evaluation of Machine Translation. In Proceedings of the 40th Annual Meeting on Association for Computational Linguistics (ACL '02)*. 311-318.) and precision, while using fewer parameters in the architecture.

In a first embodiment the present invention provides a computer-based system comprising a processor in electrical communication with a memory, the memory adapted to store data and instructions for executing by the processor, and a neural paraphrase generator. The neural paraphrase generator comprises: an input adapted to receive a sequence of tuples (t=(t$_1$, . . . , t$_n$)) comprising a source sequence of words, each tuple (t$_i$=(w$_i$,p$_i$)) comprising a word data element (w$_i$) and a structured tag element (p$_i$), the structured tag element representing a linguistic attribute about the word data element; a recurrent neural network (RNN) comprising an encoder and a decoder, wherein the encoder is adapted to receive a sequence of vectors representing a source sequence of words, and the decoder is adapted to predict a probability of a target sequence of words representing a target output sentence based on a recurrent state in the decoder, a set of previous words and a context vector; an input composition component connected to the input and comprising a word embedding matrix and a tag embedding matrix, the input composition component being adapted to receive and transform the input sequence of tuples into a sequence of vectors by 1) mapping the word data elements to the word embedding matrix to generate word vectors, 2) mapping the structured tag elements to the tag embedding matrix to generate tag vectors, and 3) respectively concatenating together the word vectors and the tag vectors; and an output decomposition component connected to the decoder and adapted to output a target sequence of tuples representing predicted words and structured tag elements, wherein the probability of each single tuple from the output target sequence of tuples is predicted based on a recurrent state of the decoder.

The neural paraphrase generator may be further characterized in one of more of the following: further comprising an attention module adapted to generate a custom context vector for each prediction based at least in part on an attention function; wherein the attention module is further adapted to generate an attentional vector by concatenating the decoder state and the context vector; wherein the attentional vector is passed through a softmax layer to produce a probability distribution over a word vocabulary data set; wherein the word embedding matrix and the tag embedding matrix are populated with pretrained values; wherein the structured tag element is a part-of-speech tag; further comprising a loss function adapted to learn to predict tuples of words and structured tags and comprising a custom objective function that jointly considers word and structured tag predictions; wherein the custom objective function Jt is formulated as follows:

$$J_t = \sum_D -\log p(\hat{t}|t) = \sum_D -(\log p(\hat{w}|w) + \log p(\hat{p}|p))$$

-continued $$\log p(\hat{w}|w) = \sum_{j=1}^{m} \log p(\hat{w}_j|(\hat{t}_1, \ldots, \hat{t}_{j-1}), y_j)$$

$$\log p(\hat{p}|p) = \sum_{j=1}^{m} \log p(\hat{p}_j|(\hat{t}_1, \ldots, \hat{t}_{j-1}), y_j)$$

where D is the parallel training corpus of source tuples (i.e., t), composed of aligned sequences of source words (i.e., w) and source POS tags (i.e., p), and target tuples (i.e., $\hat{t}$), composed of aligned sequences of target words (i.e., $\hat{w}$) and target POS tags (i.e., $\hat{p}$); wherein the RNN includes Long Short Term Memory (LSTM) cells; and further comprising at least one additional linguistic attribute in addition to the structured tag.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

Figure 13:
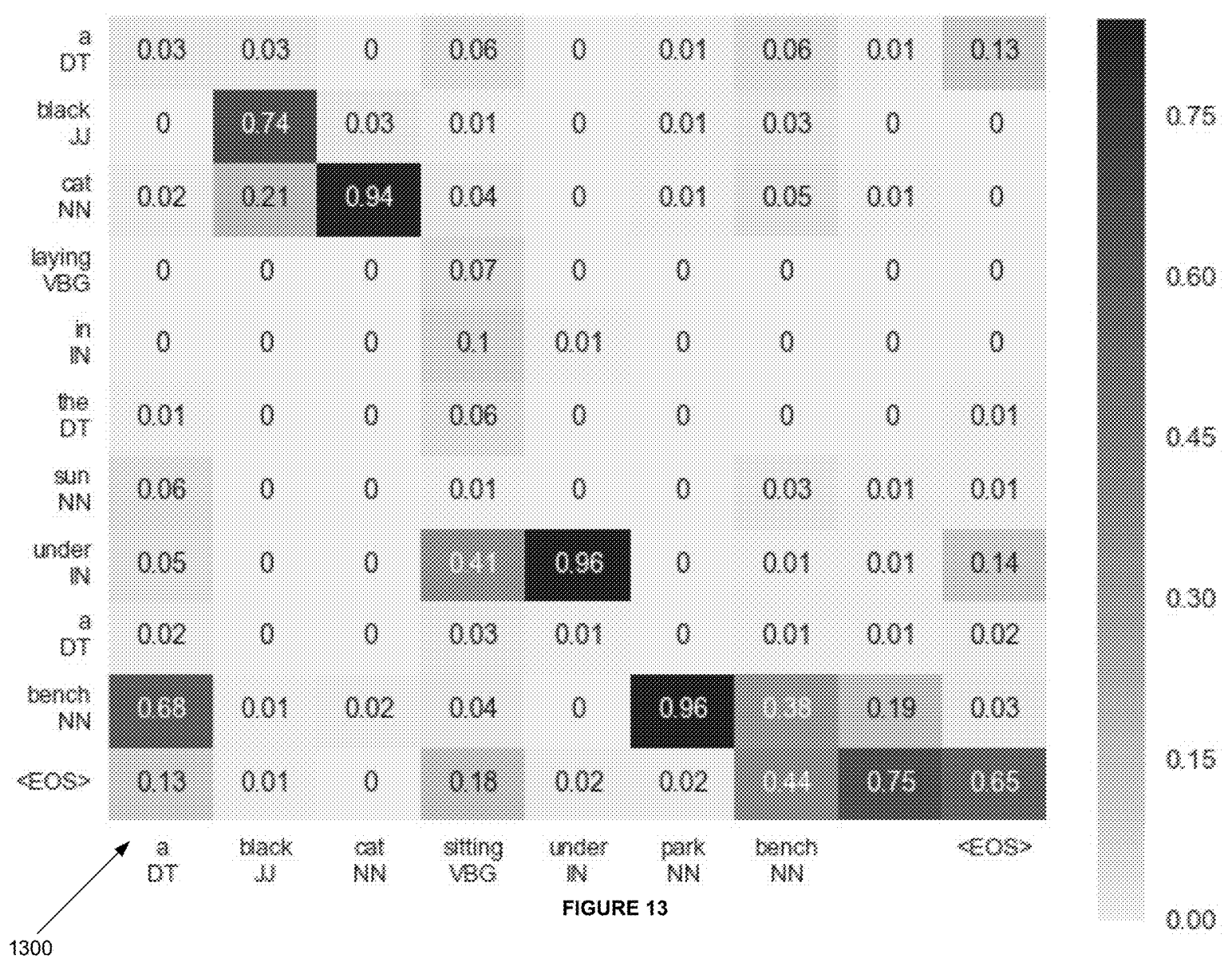

FIGS. 11-14 illustrate sample alignments on test data related to testing efficacy of the s2s-tuple model in accordance with the present invention.

DETAILED DESCRIPTION OF THE INVENTION

Figure 1:
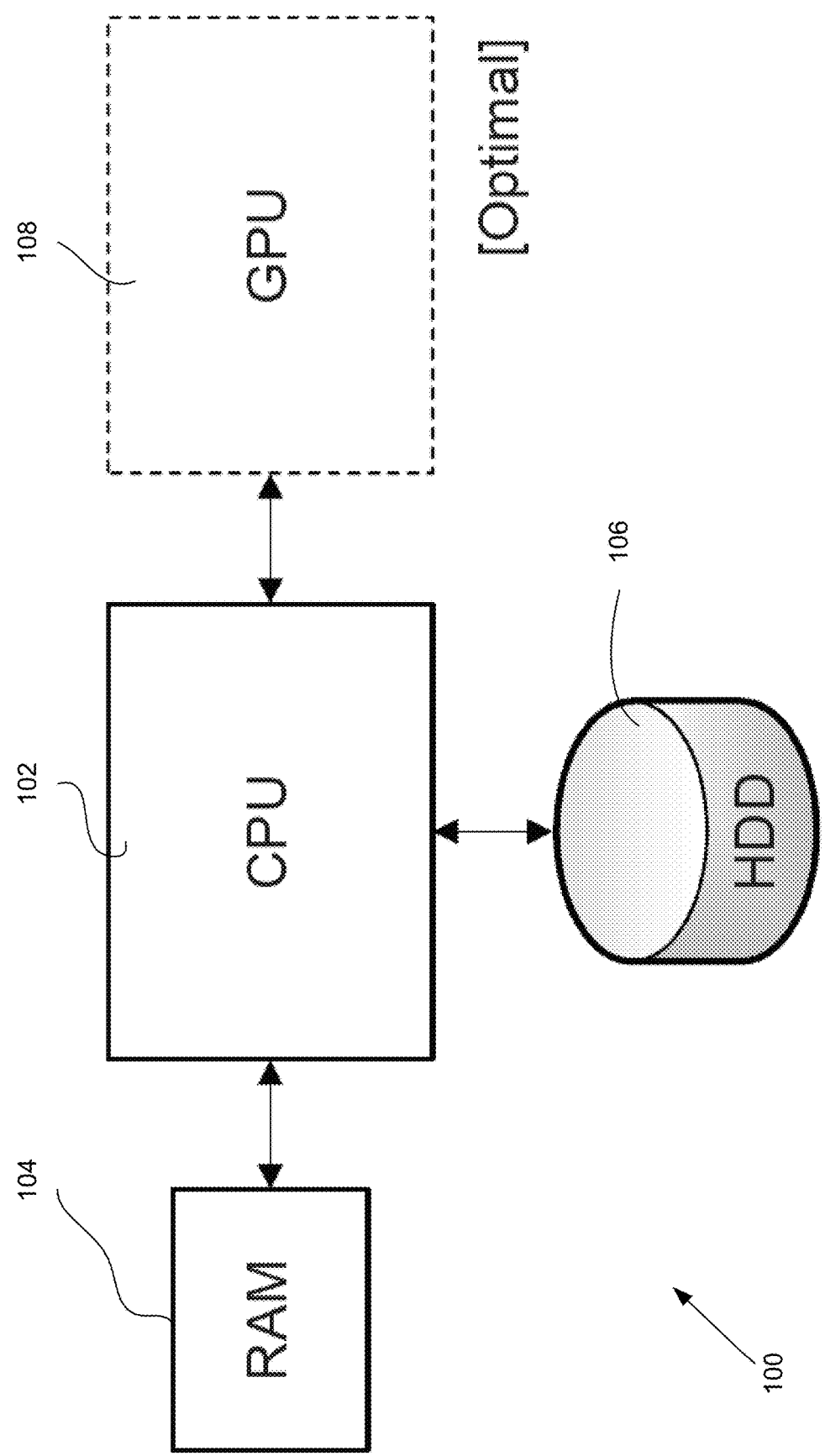
FIG. 1 is a schematic diagram illustrating a computer-based system for use in implementing the neural paraphrase generator in accordance with a first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Although exemplary embodiments incorporating the inventive concepts are described in detail herein, the exemplary embodiments are to facilitate an understanding of the operation of the present invention and are not limiting. In one embodiment described hereinbelow, the invention is a novel system and method that extends the seq2seq algorithm of Bandanau et al. (Dzmitry Bandanau, Kyung Hyun Cho, and Yoshua Bengio. 2015. Neural Machine Translation by Jointly Learning to Align and Translate. *In Proceedings of the International Conference on Learning Representations (ICLR)*.) to incorporate linguistic information, e.g., part-of-speech tags. In this exemplary manner, two novel components, namely (1) input composition component and (2) output decomposition component, are incorporated into a neural network architecture (see FIG. 3). In addition, a novel loss function may be used that combines the decomposed outputs in a single formulation, taking into account both words and linguistic attributes.

Table 1 provides a reference list of terms and equations used herein to describe operation of the present invention in accordance with the exemplary embodiments.

TABLE 1

Notation

| Name | Description |
| --- | --- |
| $W = \{w_1, \ldots, w_{|W|}\}$ | Words vocabulary |
| $E_w$ | Word embedding matrix |
| $d_w$ | Word vector dimension |
| n | Input sequence length |
| m | Output sequence length |
| $w = (w_1, \ldots, w_n)$ | Source sequence of words |
| $\hat{w} = (\hat{w}_1, \ldots, \hat{w}_m)$ | Target sequence of words |
| $x = (x_1, \ldots, x_n)$ | Encoder input vectors sequence |
| $\hat{x} = (\hat{x}_1, \ldots, \hat{x}_m)$ | Decoder input vectors sequence |
| $h = (h_1, \ldots, h_n)$ | Encoder state sequence |
| $s = (s_1, \ldots, s_m)$ | Decoder state sequence |
| $c = (c_1, \ldots, c_m)$ | Context vector sequence |
| $y = (y_1, \ldots, y_m)$ | Attentional vectors sequence |
| $a \frown b$ | Concatenation vector of a and b |
| $P = \{p_1, \ldots, p_{|P|}\}$ | POS tagset |
| $E_p$ | POS tag embedding matrix |
| $d_p$ | POS tag vector dimension |
| $p = (p_1, \ldots, p_n)$ | Source sequence of POS tags |
| $\hat{p} = (\hat{p}_1, \ldots, \hat{p}_m)$ | Target sequence of POS tags |
| $t = (t_1, \ldots, t_n)$ | Source sequence of tuples |
| $\hat{t} = (\hat{t}_1, \ldots, \hat{t}_m)$ | Target sequence of tuples |
| $t_i = (w_i, p_i)$ | i-th source tuple |
| $\hat{t}_j = (\hat{w}_j, \ldots, \hat{p}_j)$ | j-th target tuple |

Figure 2:
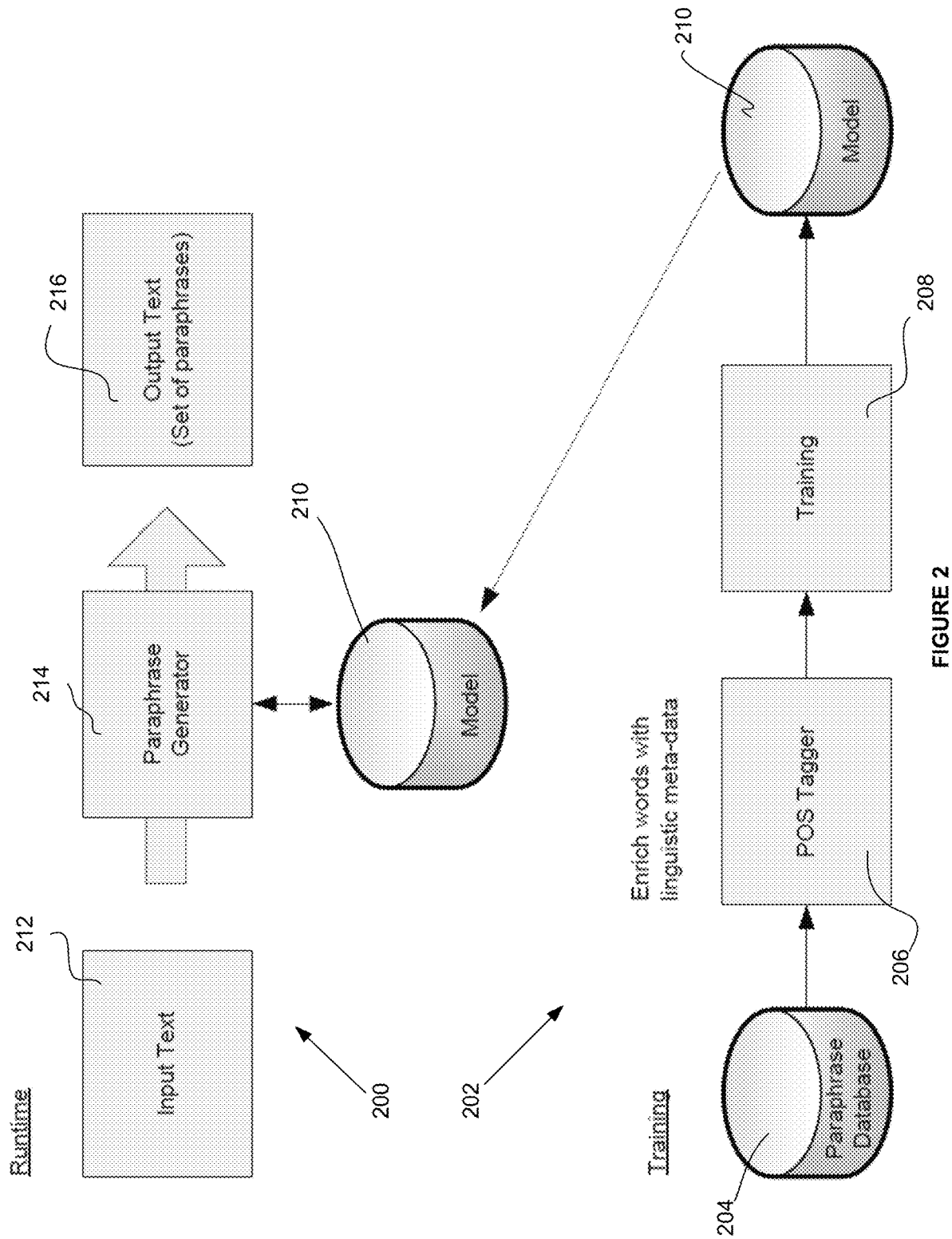
FIG. 2 is a schematic diagram illustrating a second computer-based system for use in implementing the neural paraphrase generator including a training process in accordance with a first embodiment of the present invention.

In one exemplary configuration, and with reference to FIG. 1, the paraphrase generator of the present invention is implemented by specially adapting a computer-based system 100 with a CPU 102, memory 104 and data storage 106 and may additionally utilize a Graphical Processing Unit (GPU) 108 to expedite, facilitate and enhance learning and inference. Now with reference to FIG. 2, the parameters of the model may be optimally learned from data in a supervised learning setting and the model may be used during inference to generate new paraphrases for input texts. A runtime operation 200 may be optimized by offline training operation 202. In training operation 202, a paraphrase database 204 is accessible by POS tagger module 206 and used to enrich words with linguistic meta-data, e.g., tagging for structured data. A training module 208 is applied against tagged training data and used in the exemplary neural paraphrase generator s2s model 210. During runtime operation 200 the model 210 is accessed such as by a processor/memory-based system receiving input text 212, e.g., sequences of words such as sentences, for processing by paraphrase generator 214, e.g., RNN-based system described below, for generating output text at 216 such as paraphrased sentences arrived at be predictive means.

NEURAL PARAPHRASE MODEL—We now describe the invention in use with an RNN/LSTM encoder-decoder structure with a seq2seq neural paraphrase model that consists of two components: (1) an encoder and (2) a decoder. The encoder is fed with a sequence of vectors $x=(x_1, \ldots, x_n)$, representing the source sequence of words $w=(w_1, \ldots, w_n)$ (i.e., the source sentence), and produces a sequence of states $h=(h_1, \ldots, h_n)$. We denote the vocabulary of considered words as $W=\{w_1, \ldots, w_{|W|}\}$.

A $|W| \times d_w$ word embedding matrix $E_w$ is typically used to map each word $w_i \in W$ to a $d_w$-dimensional vector $x_i$. In this exemplary approach we build the encoder by using an RNN, such that:

$$h_i = f_{enc}(x_i, h_{i-1}) \quad (1)$$

where $h_i$ refers to the i-th recurrent state in the encoder, and $f_{enc}$ to some nonlinear function. Popular choices for $f_{enc}$ are a vanilla RNN unit, a GRU (Junyoung Chung, Caglar Gulcehre, KyungHyun Cho, and Yoshua Bengio. 2014. *Empirical evaluation of gated recurrent neural networks on sequence modeling. arXiv preprint arXiv:* 1412.3555 (2014).), or an LSTM unit (Sepp Hochreiter and Jürgen Schmidhuber. 1997. *Long short-term memory. Neural computation* 9, 8 (1997), 1735-1780.). In this work, following (Minh-Thang Luong, Hieu Pham, and Christopher D Manning. 2015. *Effective approaches to attention-based neural machine translation. arXiv preprint arXiv:* 1508.04025 (2015). Minh-Thang Luong, Ilya Sutskever, Quoc V Le, Oriol Vinyals, and Wojciech Zaremba. 2014. *Addressing the rare word problem in neural machine translation. arXiv preprint arXiv:* 1410.8206 (2014). Ilya Sutskever, Oriol Vinyals, and Quoc V. Le. 2014. *Sequence to Sequence Learning with Neural Networks. In Proceedings of the 27th International Conference on Neural Information Processing Systems (NIPS'14)*. 3104-3112.) we used LSTM as $f_{enc}$.

Moreover, we formulated $f_{enc}$ as a bidirectional RNN (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR)*. Denny Britz, Anna Goldie, Thang Luong, and Quoc Le. 2017. *Massive Exploration of Neural Machine Translation Architectures. arXiv preprint arXiv:* 1703.03906 (2017)), where the encoder state $h_i$ is obtained by concatenating the state produced by a forward RNN $\overrightarrow{h_i}$, that consumes the input sequence in order, and a backward RNN $\overleftarrow{h_i}$, that consumes the input sequence in reverse order, that is $$h_i = \overrightarrow{h_i} \frown \overleftarrow{h_i}.$$

One primary goal of the decoder is to predict the probability of a target sequence of words $\hat{w}=(\hat{w}_1, \ldots, \hat{w}_m)$, representing the target output sentence. In this example, the probability of each target word $\hat{w}_j$ in the output sequence is predicted based on the recurrent state in the decoder RNN $s_j$, the previous words $(\hat{w}_1, \ldots, \hat{w}^j_{-1})$ and a context vector $c_j$. Context vectors are used to transfer information between the encoder and the decoder. In (Ilya Sutskever, Oriol Vinyals, and Quoc V. Le. 2014. *Sequence to Sequence Learning with Neural Networks. In Proceedings of the 27th International Conference on Neural Information Processing Systems (NIPS'14).* 3104-3112.), for instance, a single context vector is defined and set equal to the last hidden state in the encoder, that is $c_j = h_n$, $\forall j \in [1,m]$.

In this embodiment, we include an "attention mechanism" (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).* Sébastien Jean, Kyunghyun Cho, Roland Memisevic, and Yoshua Bengio. 2015. *On Using Very Large Target Vocabulary for Neural Machine Translation. In Proceedings of the 53rd Annual Meeting of the Association for Computational Linguistics and the 7th International Joint Conference on Natural Language Processing (Volume 1: Long Papers).* 1-10. Minh-Thang Luong, Hieu Pham, and Christopher D Manning. 2015. *Effective approaches to attention-based neural machine translation. arXiv preprint arXiv: 1508.04025* (2015).) to generate a custom context vector $c_j$ for each prediction as follows:

$$c_j = \sum_{i=1}^{n} a_{ij} h_i \qquad (2)$$

$$a_{ij} = \frac{\beta_{ij}}{\sum_{n=1}^{n} \beta_{ij}} \qquad (3)$$

$$\beta_{ij} = f_{att}(s_j, h_i) \qquad (4)$$

where $f_{att}$, referred to as attention or alignment function, outputs a score that reflects how well the i-th input and the j-th output match. Examples of alignment functions are the additive formulation of (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).*) and the multiplicative of (Minh-Thang Luong, Hieu Pham, and Christopher D Manning. 2015. *Effective approaches to attention-based neural machine translation. arXiv preprint arXiv: 1508.04025* (2015).). Following (Denny Britz, Anna Goldie, Thang Luong, and Quoc Le. 2017. *Massive Exploration of Neural Machine Translation Architectures. arXiv preprint arXiv: 1703.03906* (2017). Minh-Thang Luong, Hieu Pham, and Christopher D Manning. 2015. *Effective approaches to attention-based neural machine translation. arXiv preprint arXiv: 1508.04025* (2015).) we combine the j-th decoder state $s_j$ and the j-th context vector $c_j$ by employing a concatenation layer, as follows:

$$y_j = \tan h(W_{mix}(s_j \frown c_j) + b_{mix} \qquad (5)$$

where $y_j$, referred to as attentional vector, is the output of a fully connected layer with tan h activation function taking as input the concatenation of $s_j$ and $c_j$.

The attentional vector $y_j$ is then passed through a softmax layer to produce a probability distribution over the word vocabulary W, formulated as follows:

The final objective function can be formulated as follows:

$$p(\hat{w}_j | (w_1, \ldots, w^j_{-1}), y_j) = \text{softmax}(W_w y_j + b_w). \qquad (6)$$

The final objective function can be formulated as:

$$J_w = \Sigma_D - \log p(\hat{w}|w) \qquad (7)$$

$$\log p(\hat{w}|w) = \sum_{j=1}^{m} \log p(\hat{w}_j | (\hat{w}_1, \ldots, \hat{w}_{j-1}), y_j) \qquad (8)$$

where D is the parallel training corpus of sources (i.e., w) and targets (i.e., $\hat{w}$) sentences. The whole model is trained end-to-end by minimising $J_w$ using, for instance, stochastic gradient descent.

After training is completed, the network can infer a paraphrase given a source sentence. This is usually done by iteratively selecting words from the probability distribution $p(\hat{w}_j|(\hat{w}_1, \ldots, w\hat{j}_{-1}), y_j)$ using an output generation criterion, until an end of sentence (EOS) symbol is predicted. Popular examples of such criteria include greedy 1-best search or beam search. (Graham Neubig. 2017. *Neural Machine Translation and Sequence-to-sequence Models: A Tutorial. arXiv preprint arXiv: 1703.01619* (2017).)

POS Tags Integration. Now with reference to FIG. 4, a novel neural paraphrase generation (NPG) system and method are shown. In this embodiment, the NPG system extends the RNN encoder-decoder neural paraphrase model to incorporate part-of-speech information. In order to do that, we introduce two new components, 1) input composition and 2) output decomposition. For input composition, we refer to and incorporate herein by reference the teachings of (Ion Androutsopoulos and Prodromos Malakasiotis. 2010. *A Survey of Paraphrasing and Textual Entailment Methods. J. Artif. Int. Res.* 38, 1 (May 2010), 135-187.) For output decomposition, we refer to and incorporate herein by reference the teachings of (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR).*) *output decomposition*, and we propose a way to wire them in the overall architecture (see FIG. 4). Moreover, we define a loss function that combines the decomposed outputs in a single formulation, taking into account both words and POS tags.

Figure 3:
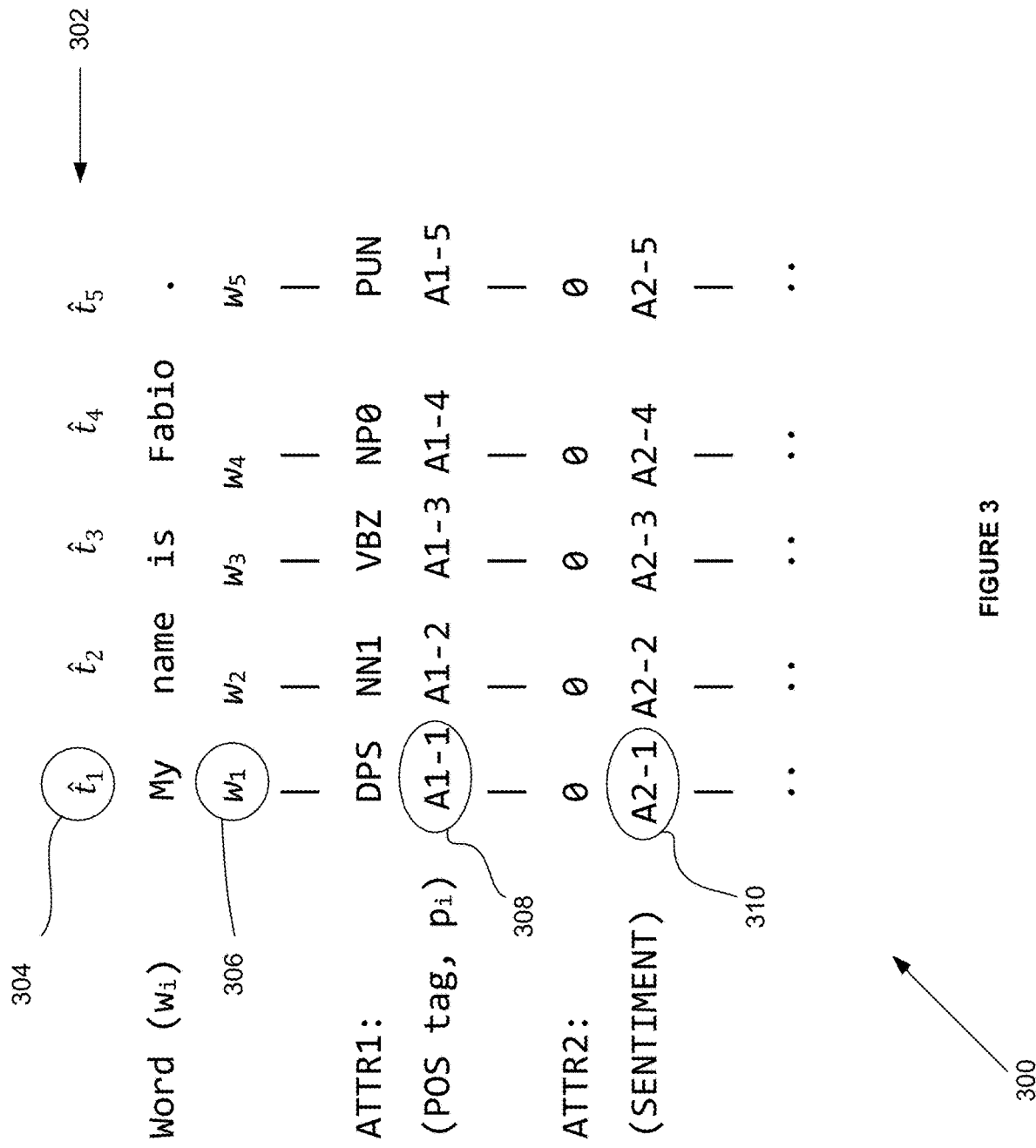
FIG. 3 is an exemplary tuple diagram associated with the present invention.

FIG. 3 illustrates an exemplary input tuple sequence with source word sequence ($w_i$) comprising the source sentence "My name is Fabio." In this example, word 1 ($w_1$) is "My", word 2 ($w_2$) is "name", word 3 ($w_3$) is "is", and word 4 ($w_4$) is "Fabio", and word 5 ($w_5$) is ".". The corresponding tuple ($t_i$) includes two attributes "ATTR1" and "ATTR2". ATTR1 represents a part-of-speech attribute tagset, e.g., as a POS tag, A1-1 . . . A1-5. Attributes A1-1 through A1-5 (DPS, NN1, VBZ, NP0, PUN) correspond to words $w_1$ through $w_5$. See Appendix for known language and other POS tagsets available for use in connection with the present invention. In this example a second attribute ATTR2 represents a sentiment tagset, A2-1 . . . A2-5 that also correspond to words $w_1$ through $w_5$.

Figure 4:
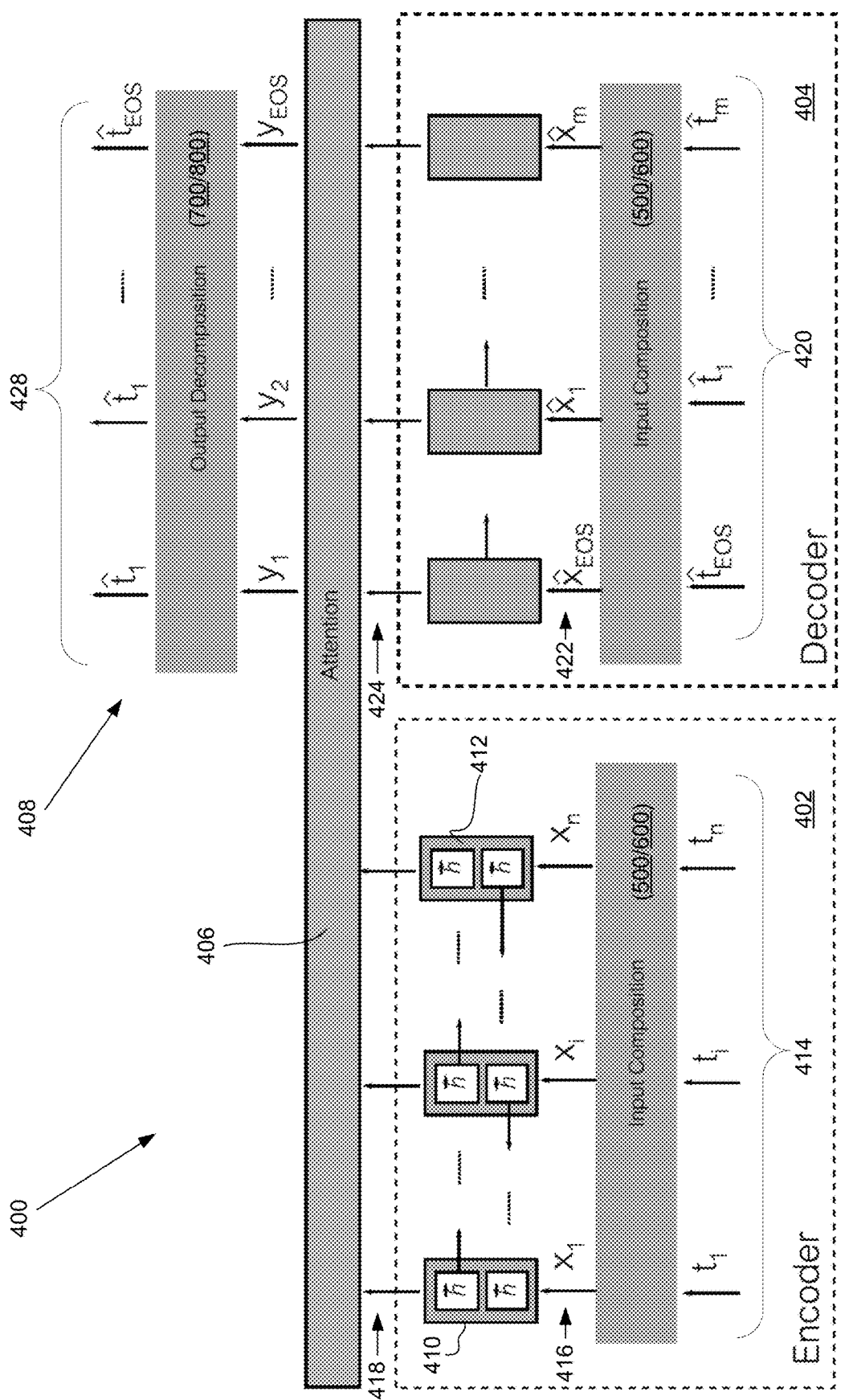
FIG. 4 is a schematic diagram illustrating an exemplary RNN with encoder/decoder for implementing the neural paraphrase generator in accordance with the present invention.
Figure 5:
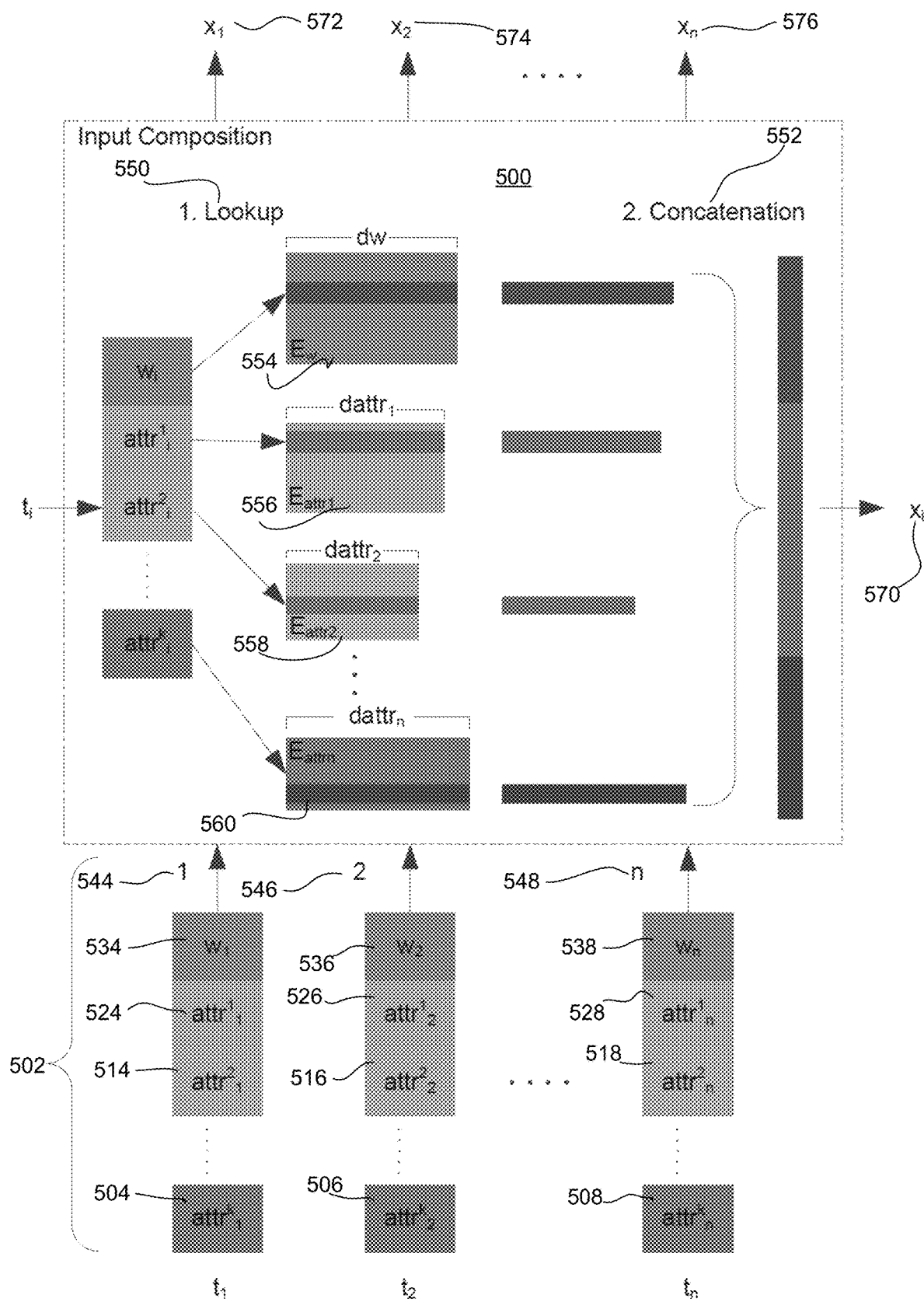
FIG. 5 is an exemplary input composition component for implementing the neural paraphrase generator in accordance with the present invention.
Figure 6:
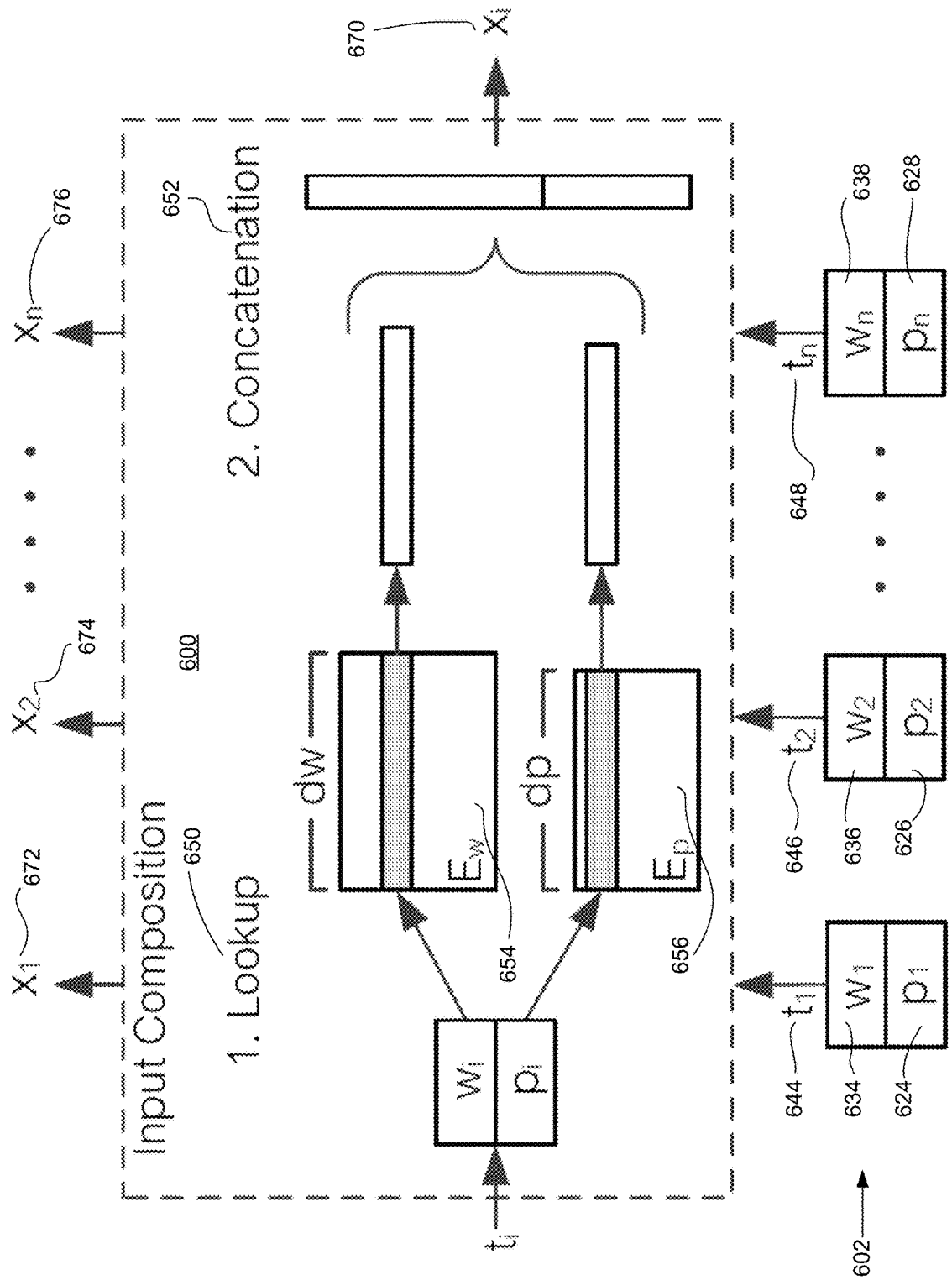
FIG. 6 is a second exemplary input composition component for implementing the neural paraphrase generator in accordance with the present invention.

In the exemplary embodiment of the present invention represented in FIGS. 4-8, a neural paraphrase generator 400 is shown as a computer-based system comprising a processor in electrical communication with a memory wherein the memory is adapted to store data and instructions for executing by the processor. The neural paraphrase generator 400 comprises an RNN encoder 402 and decoder 404 and an attention module 406 for delivering predictive paraphrase output 426 to output decomposition component 408. Input of input composition 402 (FIGS. 5—500; FIGS. 6—600) is adapted to receive a sequence of tuples (t=(t$_1$, . . . , t$_n$)) 414 (FIGS. 5—502; FIGS. 6—602), e.g., representing a source sentence, comprising a source sequence of words. Each tuple (ti=(w$_i$,p$_i$)) comprises a word data element, e.g., (w$_i$), and an attribute or structured tag element, e.g., (attr$_1$) or (p$_i$)—refer to FIGS. 5 and 6 for more detail description of input composition component 500/600. The structured tag element (624, 626, 628) representing a linguistic attribute about the word data element. The recurrent neural network (RNN) preferably includes LSTM cells and comprises an encoder 402 and a decoder 404, wherein the encoder 402 is adapted to receive a sequence of vectors 416 representing a source sequence of words, and the decoder 404 is adapted to predict a probability of a target sequence of words representing a target output sentence 424 based on a recurrent state in the decoder, a set of previous words and a context vector. The use of LSTM cells helps overcome the potential problem with RNN of long term dependencies.

Figure 7:
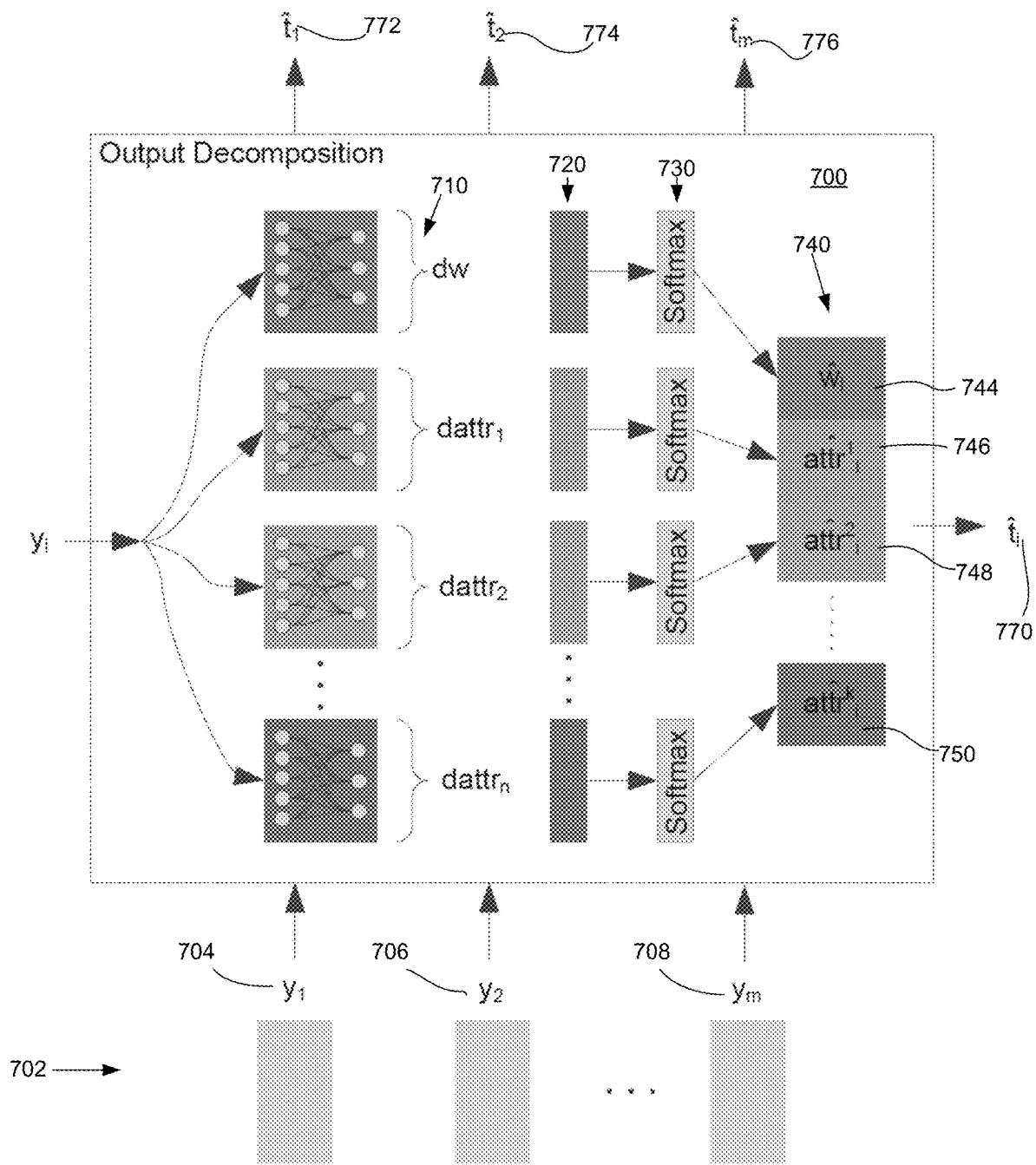
FIG. 7 is an exemplary output decomposition component for implementing the neural paraphrase generator in accordance with the present invention.
Figure 8:
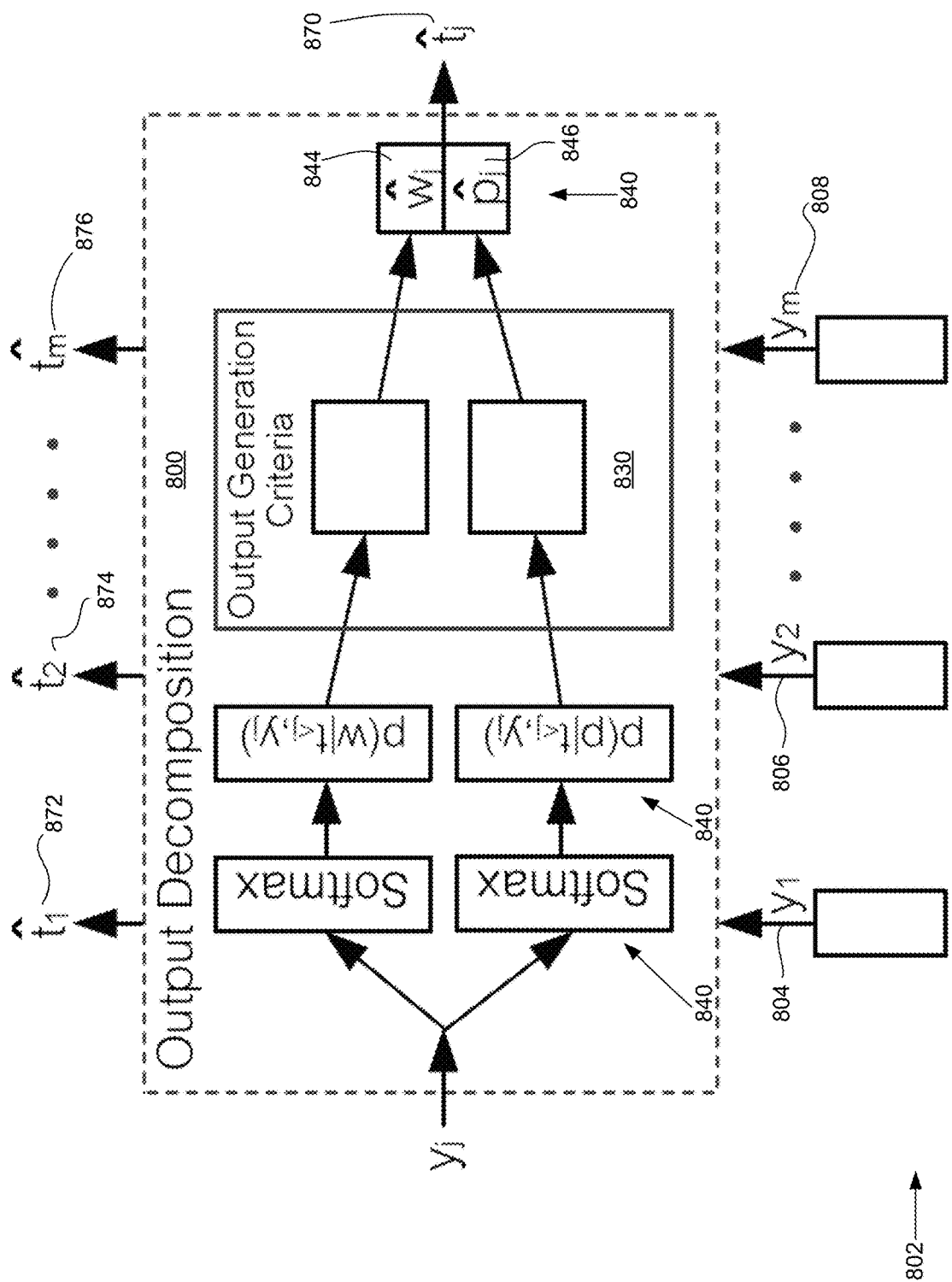
FIG. 8 is a second exemplary output decomposition component for implementing the neural paraphrase generator in accordance with the present invention.

As shown in FIGS. 5 and 6, the input composition component 500/600 is connected to the input to receive source tupple sequence 502/602 and comprises a word embedding matrix 554/654 and a tag embedding matrix 556/656. The input composition component 500/600 is adapted to receive and transform the input sequence of tuples 502/602 into a sequence of vectors x$_i$ 570/670 by 1) mapping the word data elements (534/536/538; 634/636/638) to the word embedding matrix 554/654 to generate word vectors, 2) mapping the structured tag elements (524/526/528 (and 514/516/518); 624/626/628) to the tag embedding matrix 556 (and 558-560)/656 to generate tag vectors, and 3) respectively concatenating together the word vectors and the tag vectors. As shown in FIGS. 7 and 8, an output decomposition component 700/800 is connected to the decoder and adapted to output a target sequence of tuples (572-576; 672-676) representing predicted words and structured tag elements, wherein the probability of each single tuple from the output target sequence of tuples is predicted based on a recurrent state of the decoder.

With reference to FIG. 4, the neural paraphrase generator 400 includes an attention module 406 adapted to generate a custom context vector for each prediction based at least in part on an attention function. The attention module is further adapted to generate an attentional vector by concatenating the decoder state and the context vector. The attentional vector is passed through a softmax layer to produce a probability distribution over a word vocabulary data set—W. The word embedding matrix 554/654 and the tag embedding matrix 556-560/656 are optimally populated with pretrained values. The structured tag element is preferably a part-of-speech tag. In addition, the NPG 400 may include a loss function adapted to learn to predict tuples of words and structured tags and comprising a custom objective function that jointly considers word and structured tag predictions. The custom objective function Jt is described in more detail hereinbelow.

Input Composition. The key purpose of the input composition component is to feed the RNN, both for the encoder and the decoder, with two types of information: words and corresponding POS tags. Let the POS tagset be denoted by P={p$_1$, . . . , P|p|}. We consider in input an aligned sequence of words and POS tags. In particular, the input data can be represented as a sequence of tuples t=(t$_1$, . . . , t$_n$), where t$_i$ contains a word w$_i \in$W and the corresponding POS tag p$_i \in$P that is t$_i$=(w$_i$, p$_i$).

The main purpose of this component is to transform the input data into a sequence of vectors x=(x$_1$, . . . , x$_n$). To this end, we defined, in addition to the word embedding matrix E$_w$, a |P|×d$_p$ POS tag embedding matrix E$_p$, that maps each POS tag p$_i \in$P to a d$_p$-dimensional vector. Both those matrices can be randomly initialized or populated with pre-trained values.

The first task of the input composition component is to retrieve for each tuple t$_i$=(w$_i$,p$_i$) the word vector x$_{w_i} \in \mathbb{R}^{d_w}$, by performing a lookup from E$_w$, and the POS tag vector x$_{p_i} \in \mathbb{R}^{d_p}$, by performing a lookup from E$_p$. The final vector x$_i \in \mathbb{R}^{d_w+d_p}$ is obtained by concatenating together the word and the POS tag vectors, that is x$_i$=x$_{w_i}$⌢ x$_{p_i}$. FIG. 5 and FIG. 6 graphically depict this process.

Output Decomposition. The input composition component allows the RNN to be fed with both words and POS tags. These two pieces of information flow through the network, and jointly affect both the encoder and the decoder state, as well as the attention context. The main goal of the output decomposition component is to predict both words and POS tags from the output of the neural network.

More formally, the output decomposition component attempts to predict the probability of a target sequence of tuples $\hat{t}$=($\hat{t}_1$, . . . , $\hat{t}_m$), where the probability of each single tuple $\hat{t}_j$=($\hat{x}_j$, $\hat{p}_j$) in the output sequence is predicted based on the recurrent state in the decoder RNN s$_j$, the previous tuples ($\hat{t}_1$, . . . , $\hat{t}_{j-1}$) and the context vector c$_j$.

In order to achieve this goal, we define two distinct probability distributions, the first over the vocabulary of words W and the second over the POS tags vocabulary P. To predict the probability of both $\hat{x}_j$ and $\hat{p}_j$, we employ two different softmax layers, both fed with the same attentional vector y$_j$, as follows:

$$p(\hat{w}_j \mid (\hat{t}_1, \ldots, \hat{t}_{j-1}), y_j) = \text{softmax}(W_w y_j + b_w) \quad (9)$$

$$p(\hat{p}_j \mid (\hat{t}_1, \ldots, \hat{t}_{j-1}), y_j) = \text{softmax}(W_p y_j + b_p) \quad (10)$$

FIG. 7 and FIG. 8 graphically depict this process.

Loss Function. Preferably, the neural model correctly predicts both words and POS tags. To enforce this we defined a custom objective function J$_t$ that jointly takes into account words and POS tags predictions. In this example, J$_t$ can be formulated as follows:

$$J_t = \Sigma_\mathbb{D} -\log p(\hat{t}|t) = \Sigma_\mathbb{D} -(\log p(\hat{w}|w) + \log p(\hat{p}|p)) \quad (11)$$

$$\log p(\hat{w} \mid w) = \sum_{j=1}^{m} \log p(\hat{w}_j \mid (\hat{t}_1, \ldots, \hat{t}_{j-1}), y_j) \quad (12)$$

$$\log p(\hat{p} \mid p) = \sum_{j=1}^{m} \log p(\hat{p}_j \mid (\hat{t}_1, \ldots, \hat{t}_{j-1}), y_j) \quad (13)$$

where $\mathbb{D}$ is the parallel training corpus of source tuples (i.e., t), composed of aligned sequences of source words (i.e., w) and source POS tags (i.e., p), and target tuples (i.e., $\hat{t}$), composed of aligned sequences of target words (i.e., $\hat{w}$)) and target POS tags (i.e., $\hat{p}$). The final model is trained end-to-end by minimising J$_t$.

Experiments/Datasets. We conducted an experimental study on real-world data to compare the inventive model with other approaches. To validate the effectiveness of the proposed neural paraphrase generation model, we employed two data sets, namely PPDB 2.0 (Ellie Pavlick, Pushpendre Rastogi, Juni Ganitkevitch, Benjamin Van Durme, and Chris Callison-Burch. 2015. *PPDB 2.0: Better paraphrase ranking, fine-grained entailment relations, word embeddings, and style classification. In Proceedings of the 53rd Annual Meeting of the Association for Computational Linguistics and the 7th International Joint Conference on Natural Language Processing (Volume 2: Short Papers)*. 425-430.) and COCO (Tsung-Yi Lin, Michael Maire, Serge Belongie, Lubomir Bourdev, Ross Girshick, James Hays, Pietro Perona, Deva Ramanan, C. Lawrence Zitnick, and Piotr Dollar. 2014. *Microsoft COCO: Common Objects in Context. arXiv preprint arXiv:* 1405.0312 (2014).).

The PPDB 2.0 data set is a large-scale phrasal paraphrase data set that has been mined automatically based on (Colin Bannard and Chris Callison-Burch. 2005. *Paraphrasing with Bilingual Parallel Corpora. In Proceedings of the 43rd Annual Meeting on Association for Computational Linguistics (ACL '05)*. 597-604.), and refined with machine learning based ranking of paraphrases based on human generated ground-truth and assignment of textual entailment labels for each paraphrase pair. In this work, we used the large pack of lexical (single word to single word) and phrasal (multi-word to single or multi-word) paraphrases. Because the data set was automatically generated, some of the paraphrase pairs are not true paraphrases. In our experiments, we kept only pairs that do not contain numeric digits. We also use the textual entailment labels with which paraphrase pairs in the data set are annotated and keep the pairs labeled as equivalent. We split the remaining data in 757,300 training data points and 39,325 test data points. The splitting is performed by first creating a graph where phrases are nodes and edges exist between the two phrases in a paraphrase pair. In this graphical manner, we identify connected components and we assign all data points within each connected component to either the training or the test sets. This process guarantees independence between the training and the test sets.

We also used the image captions from COCO, a data set for image recognition, segmentation and captioning. In this data set, for every image, there are five crowd-sourced one-sentence descriptions of the image. We considered these sentences to be paraphrase of each other since they describe the same image. We used the provided training and test splits, removing any descriptions that are longer than 15 words or contain numeric digits. To form the training data set, we created all possible pairs of descriptions, leading to a maximum of 20 data points per image. For the test set, we considered each caption as a source sentence to paraphrase and the remaining four sentences as ground-truth. In total, the training and test data sets have 1,377,284 and 184,219 data points, respectively.

TABLE 2

Properties of PPDB and COCO data sets for evaluating paraphrase generation.

| | PPDB | COCO |
|---|---|---|
| Number of training data points | 757,300 | 1,377,284 |
| Number of test data points | 39,325 | 184,219 |
| Average length | 3.13 | 10.77 |
| Vocabulary size | 24,220 | 25,276 |

Figure 9:
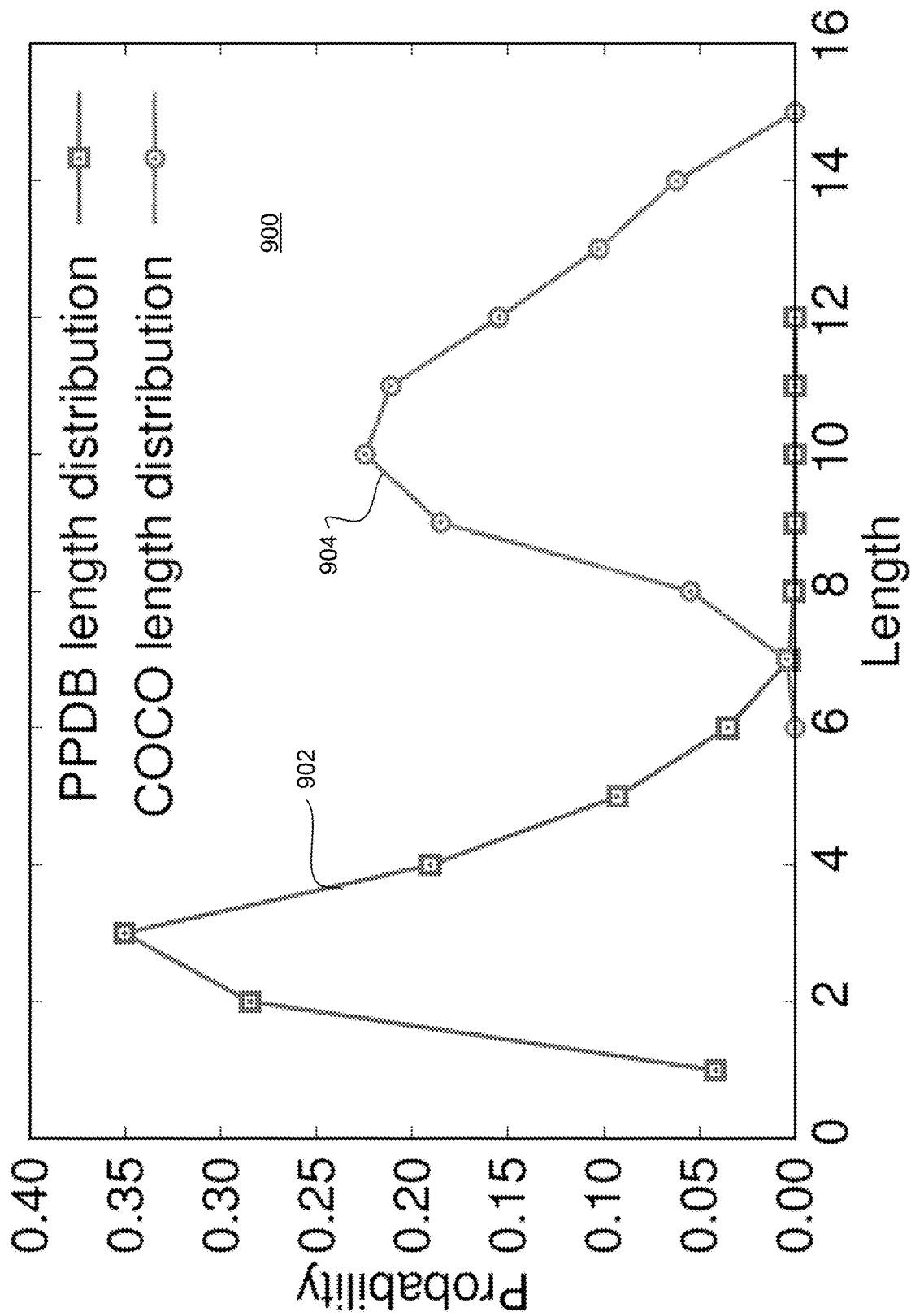
FIG. 9 is a graph illustrating the results of testing efficacy of one implementation of the invention in connection with two databases.

Table 2 provides details on the two data sets employed in this example. FIG. 9 shows a graph 900 of the distribution of lengths of source and target phrases and sentences for the two data sets. We observe that the phrases in PPDB data set 902 are shorter than the descriptions of images in COCO 904.

We used the NLP4̃ parser to tokenize the sentences and to generate POS tags (Jinho D Choi and Martha Palmer. 2012. *Fast and robust part-of-speech tagging using dynamic model selection. In Proceedings of the 50th Annual Meeting of the Association for Computational Linguistics: Short Papers-Volume 2. Association for Computational Linguistics*, 363-367.). For the PPDB data set we implemented a similar approach of (Kuzman Ganchev, Keith Hall, Ryan McDonald, and Slav Petrov. 2012. *Using Search-logs to Improve Query Tagging. In Proceedings of the 50th Annual Meeting of the Association for Computational Linguistics: Short Papers—Volume 2 (ACL '12). Association for Computational Linguistics*, Stroudsburg, Pa., USA, 238-242. http://dl.acm.org/citation.cfm?id=2390665.2390723) to improve the accuracy of the syntactic analysis. In particular, we annotated a large corpus of news articles and we transferred the POS tags from the snippet tokens that matched PPDB sentences (we selected the most frequent annotation for each sentence). We directly applied the NLP4̃ parser on COCO, since this dataset contains well-formed English sentences. The tagset P for both data sets is composed of 50 POS tags.

Methodology. The evaluation was to assess if adding part of speech information in a neural seq2seq model improves the performance of a paraphrase generation system. We focused the experiment on two models: 1) s2s-word, the seq2seq neural model with attention described in (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR)*. Minh-Thang Luong, Hieu Pham, and Christopher D Manning. 2015. *Effective approaches to attention-based neural machine translation. arXiv preprint arXiv:* 1508.04025 (2015).) that aims at minimizing Jw (Eq. 7); and 2) s2s-tuple, the model described in this paper that incorporates POS tags in an attentional seq2seq neural architecture by minimizing $J_t$ (Eq. 11).

TABLE 3

Parameters for the sequence-to-sequence models

| Name | Description |
|---|---|
| embedding dimension | 150 |
| encoder/decoder units | 150 |
| encoder/decoder dropout input | 0.2 |
| encoder/decoder dropout output | 0 |
| rnn cell | LSTM |
| number of steps | 100,000 |
| batch size | 256 |
| learning rate | 0.001 |
| attention function | additive [2] |

We used the parameters in Table 3 to train both models, unless explicitly stated otherwise. In particular, we used a batch size of 256 training samples, 150-unit LSTM cells for both the encoder and the decoder, dropout of 0.2 at the input of each cell, a bidirectional encoder, greedy 1-best search output generation criteria, additive attention function as $f_{att}$. We trained using the Adam optimizer and a learning rate of 0.001 and let the models train for 100,000 steps (a step is an iteration over a batch of training points). We executed three independent runs for each experiment with averaged results and set the embedding dimension to 150.

However, although the embedding dimension is the same for both models, their composition is slightly different. For the s2s-tuple model, we used 100-dimensional word embeddings concatenated with 50-dimensional POS vectors as described above. In particular, we used the glove. 6B$^5$ 100d word vectors, pre-trained with the GloVe model (Jeffrey Pennington, Richard Socher, and Christopher Manning. 2014. *Glove: Global Vectors for Word Representation. In Proceedings of the* 2014 *Conference on Empirical Methods in Natural Language Processing (EMNLP* '14). 1532-1543.). Moreover, we used the GloVe model to train 50d POS vectors by substituting each word in a corpus of ~500K news articles with the corresponding POS tag. To obtain the 150-dimensional word vectors for the s2s-word model we concatenated glove. 6B 100d and 50d word vectors.

Note that with this configuration the s2s-word model has higher number of parameters than the s2s-tuple model, even if this latter introduces a new fully connected layer in the neural architecture (see Eq. 10), since the number of POS tags is much lower than the number of words. For the COCO data set, for instance, the s2s-word model has 10.96M parameters to train while the s2s-tuple model reduces this number by more than 10% (it has 9.74M parameters), with a single layer neural configuration.

For evaluation metrics we used the BLEU score and the average precision. BLEU is calculated on tokenized data using the implementation provided in the nltk framework with NIST geometric sequence smoothing. We used a modified version of the seq2seq framework (Denny Britz, Anna Goldie, Thang Luong, and Quoc Le. 2017. *Massive Exploration of Neural Machine Translation Architectures. arXiv preprint arXiv:* 1703.03906 (2017).) for training. Our version adds support for the proposed neural architecture that integrates POS tags and allows to initialize embedding matrices with pre-trained values. Training was performed on a Nvidia Tesla K80 GPU.

encoder and the decoder), whether the embeddings are pre-trained or not, the attention mechanism used, the number of parameters in the model, the BLEU score and the precision achieved.

Figure 10:
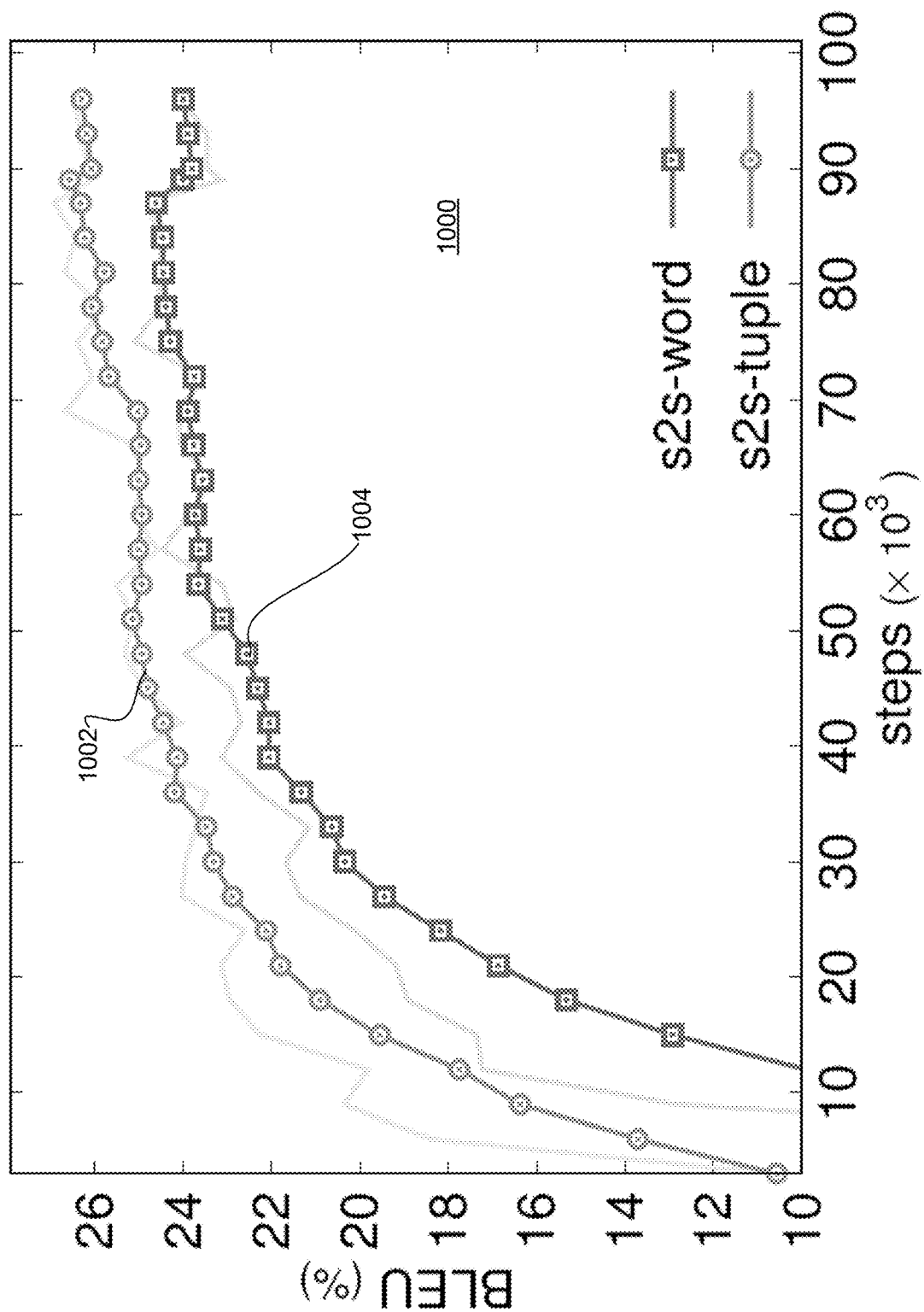
FIG. 10 is a graph illustrating the results of testing efficacy.

For the first experiment (id 1 in Table 4) we have used the PPDB data set. The experiment was designed to assess if the s2s-tuple model performs better than the s2s-word model. We also investigated several other aspects during analysis. For instance, pre-training the embeddings leads to an improvement in both BLEU score and precision. The results also show that the additive (Dzmitry Bandanau, Kyung Hyun Cho, and Yoshua Bengio. 2015. *Neural Machine Translation by Jointly Learning to Align and Translate. In Proceedings of the International Conference on Learning Representations (ICLR)*.) attention mechanism is favorable with respect to the multiplicative (Minh-Thang Luong, Hieu Pham, and Christopher D Manning. 2015. *Effective approaches to attention-based neural machine translation. arXiv preprint arXiv:* 1508.04025 (2015).) formulation. Moreover, we noticed that a single layer neural architecture outperforms a 2-layers deep architecture. We actually expected deep models to perform better (Christian Szegedy, Wei Liu, Yangqing Jia, Pierre Sermanet, Scott Reed, Dragomir Anguelov, Dumitru Erhan, Vincent Vanhoucke, and Andrew Rabinovich. 2015. *Going deeper with convolutions. In Proceedings of the IEEE Conference on Computer Vision and Pattern Recognition (CVPR* '15). 1-9. Jie Zhou, Ying Cao, Xuguang Wang, Peng Li, and Wei Xu. 2016. *Deep recurrent models with fast-forward connections for neural machine translation. arXiv preprint arXiv:* 1606.04199 (2016).), and we also tried to optimize the architecture by adding dense residual connections as described in (Denny Britz, Anna Goldie, Thang Luong, and Quoc Le. 2017. *Massive Exploration of Neural Machine Translation Architectures. arXiv preprint arXiv:* 1703.03906 (2017)) but the results show no remarkable improvement. FIG. 10 shows a smoothed plot 1000 of the BLEU scores for the PPDB data set for the s2s-tuple 1002 and the s2s-word 1004 models with this latter network configuration, where points in the

TABLE 4

Results

| id | data set | model | layers | dimension | embeddings pre-trained | attention | #parameters | BLEU | precision |
|---|---|---|---|---|---|---|---|---|---|
| 1 | PPDB | s2s-word | 1 | 150 | yes | yes multiplicative | 10.54M | 23.32 | 17.56 |
|   |      |          | 1 |     | no  | yes additive additive | 10.54M | 26.06 | 20.40 |
|   |      |          | 1 |     |     | additive | 10.54M | 25.73 | 19.60 |
|   |      |          | 2 |     |     |          | 11.08M | 24.45 | 17.80 |
|   |      | seq2seq-hybrid | 1 | 100 + 50 | yes | multiplicative additive | 9.33M | 23.45 26.18 | 18.1 20.68 |
|   |      | s2s-tuple | 1 | 100 + 50 | yes | multiplicative | 9.37M | 24.29 | 18.84 |
|   |      |           | 1 |          |     | additive additive | 9.37M | 27.62 | 22.05 |
|   |      |           | 2 |          |     |          | 9.91M | 26.23 | 20.48 |
| 2 | COCO | s2s-word | 1 | 150 | yes | additive | 10.96M | 20.60 | 0.21 |
|   |      | s2s-tuple | 1 | 100 + 50 | yes | additive | 9.74M | 21.38 | 0.24 |
| 3 | PPDB | s2s-word | 1 | 300 | yes | additive | 25.25M | 28.51 | 23.03 |
|   |      | s2s-tuple | 1 | 300 + 100 | yes | additive | 30.37M | 29.59 | 23.53 |

Results/Prediction Performance. Table 4 depicts the result of the experiments. We divided the table in three main blocks that correspond to three different experimental settings. In the table we report the id of the experiment as well as the data set used, the number of layers in the neural architecture, the embeddings dimension (this number corresponds also to the number of LSTM units for both the curves are obtained by evaluating the performance of the models every 3,000 training steps. It is possible to observe how the curve for the s2s-tuple model 1002 is consistently above the one of the s2s-word model 1004. This result highlights the main finding of all the experiments: the s2s-tuple model 1002 consistently outperforms the s2s-word model 1004, leading to an improvement with the best network configuration of more than 1.5 points in BLEU score (+6%, from 26.06 to 27.62).

To investigate the origin of this performance gain, we trained a new model, named seq2seq-hybrid. This model extends the original seq2seq architecture (described above) incorporating only the input composition component. We wanted to observe the performance of the model when POS tags are considered only in input and not predicted in output (i.e., the loss function consider only word predictions). Interestingly the seq2seq-hybrid model performed on-par with the s2s-word model. Accordingly, the boost in performance is due to the overall modification in the architecture, including the novel loss function $J_t$ that jointly considers words and POS tags predictions in the formulation.

The s2s-tuple model outperforms the s2s-word model also in our second experiment (id 2 in Table 4), conducted on the COCO data set. It is worth noting that the very low precision scores in this experiment are expected because it is less likely that the models will generate exactly a sentence from the ground truth, which would increase the precision score.

Figure 11:
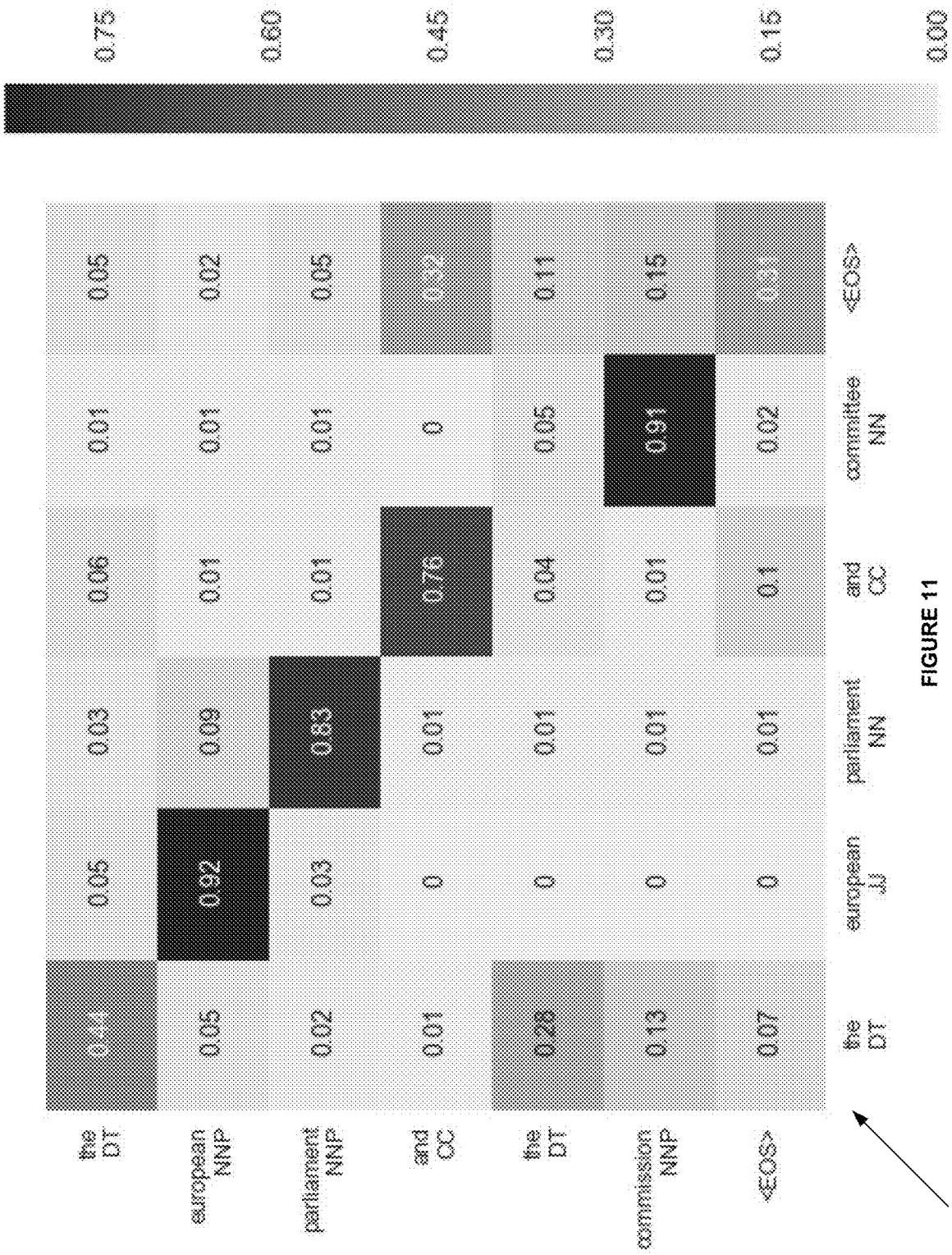
Figure 12:
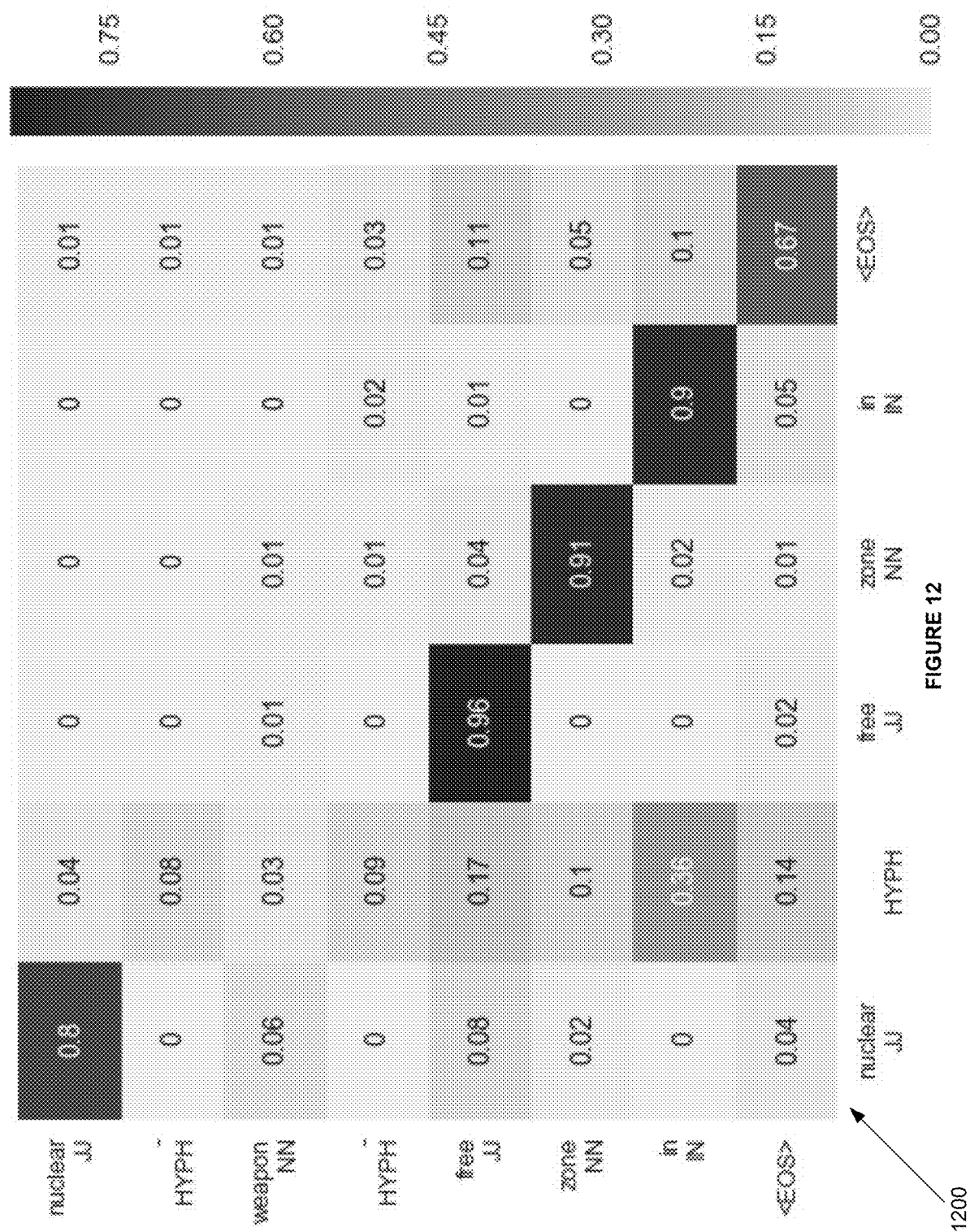
Figure 14:
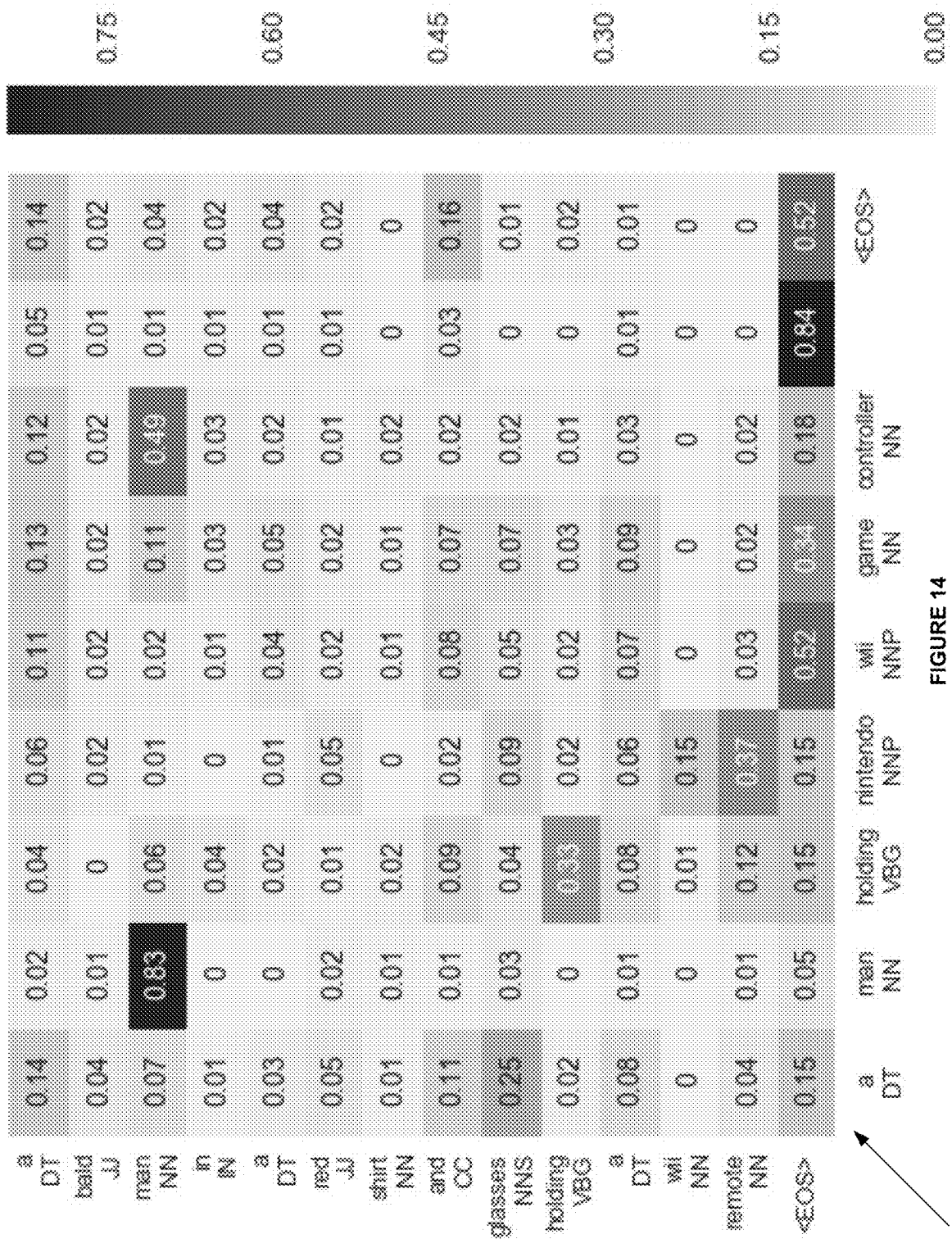

Finally, in the third experiment (id 3 in Table 4) we trained the models with larger embeddings on the PPDB data set, setting the number of encoder/decoder LSTM units to the total embedding dimension. In particular, we used glove. 6B 300d word vector for both s2s-tuple and s2s-word. For the s2s-tuple model we also used 100-dimensional POS tag vector. Larger embeddings result in better BLUE score and better precision, but the relative performance of the two competing models are stable: s2s-tuple consistently outperforms s2s-word. Our results show that incorporating part of speech information with the s2s-tuple model leads to better results (on average≈+5%) for the paraphrase generation task over the POS-agnostic s2s-word model. Remarkably, the s2s-tuple model achieves better results while using less parameters (on average ≈−10%) than the s2s-word model.

and FIG. 12 with sample alignment 1200 refer to PPDB examples while FIG. 13 with sample alignment 1300 and FIG. 14 with sample alignment 1400 refer to COCO examples. The y-axis correspond to the words and POS tags in the source sentence and the x-axis to the words and POS tags generated in output. Each cell reports the weight $\alpha_{ij}$ of Equation 3. For the PPDB figures, FIGS. 11 and 12, strong weights along the diagonal of each matrix are clearly visible. However, it is possible to observe also non-trivial alignments. For instance, in FIG. 12 the s2s-tuple model was able to skip two words tokens ("-" and "weapon") to create a correct paraphrase. This non-trivial behaviour is especially visible in the bottom COCO figures. For instance, in FIG. 14 the last words are predicted by aligning to the last state in the source. Note that the last state contains information not only on the last word but on all the words in the source sequence.

In this exemplary process, paraphrase generation was approached as a monolingual machine translation task where we extend a seq2seq model to incorporate additional linguistic information, such as POS tags. The experimental results show that our new model leads to improved performance in terms of BLEU score in two data sets. The task of machine translation, however, has a long history, and it has been studied extensively over the years. Koehn (Phillipp Koehn. 2010. *Statistical Machine Translation*. Cambridge University Press.) provides an overview of recent methods in statistical machine translation. Even though neural machine translation methods, such as seq2seq has been shown to be effective for machine translation tasks, there is no direct comparison of approaches in the literature for the task of paraphrase generation from a monolingual corpus.

As described above, the invention provides an extension of sequence to sequence models for incorporating additional linguistic information, such as POS tags, and jointly optimizing the network to generate sequences of words and POS

TABLE 5

Some paraphrases predicted by the s2s-word and the s2s-tuple models on the COCO test set.

| | s2s-word | | s2s-tuple | |
|---|---|---|---|---|
| Source | hypothesis | BLEU | hypothesis | BLEU |
| a cat holding it's mouth open next to a car door window. | a cat is curious at of the window window. | 17.16 | a cat is looking out of the car window. | 93.06 |
| an old fashioned train traveling down some tracks. | a old is on down the tracks tracks. | 14.92 | a train is going down the railroad tracks. | 88.91 |
| four jet airplanes flying straight up in the sky leaving a smoke trail. | four jets flying in formation in the blue sky | 80.34 | four airplanes are in formation leaving the formation sky | 12.54 |
| a cat is sitting in front of the tv watching tv | a cat sitting on a floor watching the..advertisement.the television.. watches tv. | 20.10 | a cat sitting on the floor watching television. | 91.93 |
| a surfer wearing red and black shorts rides a white surfboard. | a man man riding a surfboard on a wave. | 80.91 | a man man riding shortboard surfboard on top wave. | 16.23 |

Anecdotal Results. Table 5 shows some examples of paraphrases generated by the s2s-word and the s2s-tuple models on the COCO test set. In particular, we selected examples with a BLUE scoreless than one (i.e., hypotheses and targets are different, precision is zero) and maximum difference in BLEU score between s2s-word and s2s-tuple.

FIGS. 11 to 14 report some alignment examples found by the s2s-tuple model. FIG. 11 with sample alignment 1100 tags. The inventors experimentally verified the proposed model leads to improved performance in a paraphrase generation task using one data set of phrasal paraphrases and another data set of sentential paraphrases. No prior system extends sequence-to-sequence (seq2seq) models to incorporate additional linguistic information. Additional types of linguistic information, such as lemmas, named entities, may be used in addition to POS tags as contemplated within the present invention. The invention may be used in other machine translation tasks, especially where neural network-based models are prominent, as well as other tasks such as question answering and query suggestion.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

APPENDIX

Attached is an appendix to specification that forms a part of this specification and is included by reference herein. The invention is language-agnositc in that it may be used in systems in relation to any language, spoken, written, or otherwise, without modifying the technical structure and approach. By choosing POS tags as the contextual information, a user may simply employ an appropriate or corresponding POS tagger for use with the subject language and submit the output to the method and process described in the Detailed Description portion of this specification. In addition, a supervised POS tagging process may be used to annotate a small corpus which may then be used as training data for developing a POS tagger for use with the present invention. The Appendix includes exemplary English and German taggers as suitable for use in connection with the present invention.

Appendix

UCREL CLAWS5 Tagset (http://ucrel.lancs.ac.uk/claws5tags.html)

| | |
|---|---|
| AJ0 | adjective (unmarked) (e.g. GOOD, OLD) |
| AJC | comparative adjective (e.g. BETTER, OLDER) |
| AJS | superlative adjective (e.g. BEST, OLDEST) |
| AT0 | article (e.g. THE, A, AN) |
| AV0 | adverb (unmarked) (e.g. OFTEN, WELL, LONGER, FURTHEST) |
| AVP | adverb particle (e.g. UP, OFF, OUT) |
| AVQ | wh-adverb (e.g. WHEN, HOW, WHY) |
| CJC | coordinating conjunction (e.g. AND, OR) |
| CJS | subordinating conjunction (e.g. ALTHOUGH, WHEN) |
| CJT | the conjunction THAT |
| CRD | cardinal numeral (e.g. 3, FIFTY-FIVE, 6609) (excl ONE) |
| DPS | possessive determiner form (e.g. YOUR, THEIR) |
| DT0 | general determiner (e.g. THESE, SOME) |
| DTQ | wh-determiner (e.g. WHOSE, WHICH) |
| EX0 | existential THERE |
| ITJ | interjection or other isolate (e.g. OH, YES, MHM) |
| NN0 | noun (neutral for number) (e.g. AIRCRAFT, DATA) |
| NN1 | singular noun (e.g. PENCIL, GOOSE) |
| NN2 | plural noun (e.g. PENCILS, GEESE) |
| NP0 | proper noun (e.g. LONDON, MICHAEL, MARS) |
| NULL | the null tag (for items not to be tagged) |
| ORD | ordinal (e.g. SIXTH, 77TH, LAST) |
| PNI | indefinite pronoun (e.g. NONE, EVERYTHING) |
| PNP | personal pronoun (e.g. YOU, THEM, OURS) |
| PNQ | wh-pronoun (e.g. WHO, WHOEVER) |
| PNX | reflexive pronoun (e.g. ITSELF, OURSELVES) |
| POS | the possessive (or genitive morpheme) 'S or ' |
| PRF | the preposition OF |
| PRP | preposition (except for OF) (e.g. FOR, ABOVE, TO) |
| PUL | punctuation - left bracket (i.e. ( or [ ) |
| PUN | punctuation - general mark (i.e.. ! , : ; - ? ... ) |
| PUQ | punctuation - quotation mark (i.e. ' ' " ) |
| PUR | punctuation - right bracket (i.e. ) or ] ) |
| TO0 | infinitive marker TO |
| UNC | "unclassified" items which are not words of the English lexicon |
| VBB | the "base forms" of the verb "BE" (except the infinitive), i.e. AM, ARE |
| VBD | past form of the verb "BE" |
| VBG | -ing form of the verb "BE" |
| VBI | infinitive of the verb "BE" |
| VBN | past participle of the verb "BE", i.e. BEEN |
| VBZ | -s form of the verb "BE", i.e. IS, 'S |
| VDB | base form of the verb "DO" (except the infinitive), i.e. |
| VDD | past form of the verb "DO", i.e. DID |
| VDG | -ing form of the verb "DO", i.e. DOING |
| VDI | infinitive of the verb "DO" |
| VDN | past participle of the verb "DO", i.e. DONE |
| VDZ | -s form of the verb "DO", i.e. DOES |
| VHB | base form of the verb "HAVE" (except the infinitive), i.e. HAVE |
| VHD | past tense form of the verb "HAVE", i.e. HAD, 'D |
| VHG | -ing form of the verb "HAVE" i.e. HAVING |
| VHI | infinitive of the verb "HAVE" |
| VHN | past participle of the verb "HAVE", i.e. HAD |
| VHZ | -s form of the verb "HAVE", i.e. HAS, 'S |
| VM0 | modal auxiliary verb (e.g. CAN, COULD, WILL, 'LL) |
| VVB | base form of lexical verb (except the infinitive)(e.g. TAKE, LIVE) |
| VVD | past tense form of lexical verb (e.g. TOOK, LIVED) |
| VVG | -ing form of lexical verb (e.g. TAKING, LIVING) |
| VVI | infinitive of lexical verb |
| VVN | past participle form of lex. verb (e.g. TAKEN, LIVED) |
| VVZ | -s form of lexical verb (e.g. TAKES, LIVES) |
| XX0 | the negative NOT or N'T |
| ZZ0 | alphabetical symbol (e.g. A, B, c, d) |
| NOTE: | "DITTO TAGS" |

Please see the note on ditto tags in the documentation for the CLAWS7 tagset. The same applies to the CLAWS5 tags.

Appendix

UCREL CLAWS7 Tagset (http://ucrel.lancs.ac.uk/claws7tags.html)

| | |
|---|---|
| APPGE | possessive pronoun, pre-nominal (e.g. my, your, our) |
| AT | article (e.g. the, no) |
| AT1 | singular article (e.g. a, an, every) |
| BCL | before-clause marker (e.g. in order (that),in order (to)) |
| CC | coordinating conjunction (e.g. and, or) |

| | |
|---|---|
| CCB | adversative coordinating conjunction ( but) |
| CS | subordinating conjunction (e.g. if, because, unless, so, for) |
| CSA | as (as conjunction) |
| CSN | than (as conjunction) |
| CST | that (as conjunction) |
| CSW | whether (as conjunction) |
| DA | after-determiner or post-determiner capable of pronominal function (e.g. such, former, same) |
| DA1 | singular after-determiner (e.g. little, much) |
| DA2 | plural after-determiner (e.g. few, several, many) |
| DAR | comparative after-determiner (e.g. more, less, fewer) |
| DAT | superlative after-determiner (e.g. most, least, fewest) |
| DB | before determiner or pre-determiner capable of pronominal function (all, half) |
| DB2 | plural before-determiner ( both) |
| DD | determiner (capable of pronominal function) (e.g any, some) |
| DD1 | singular determiner (e.g. this, that, another) |
| DD2 | plural determiner ( these,those) |
| DDQ | wh-determiner (which, what) |
| DDQGE | wh-determiner, genitive (whose) |
| DDQV | wh-ever determiner, (whichever, whatever) |
| EX | existential there |
| FO | formula |
| FU | unclassified word |
| FW | foreign word |
| GE | germanic genitive marker - (' or 's) |
| IF | for (as preposition) |
| II | general preposition |
| IO | of (as preposition) |
| IW | with, without (as prepositions) |
| JJ | general adjective |
| JJR | general comparative adjective (e.g. older, better, stronger) |
| JJT | general superlative adjective (e.g. oldest, best, strongest) |
| JK | catenative adjective (able in be able to, willing in be willing to) |
| MC | cardinal number,neutral for number (two, three..) |
| MC1 | singular cardinal number (one) |
| MC2 | plural cardinal number (e.g. sixes, sevens) |
| MCGE | genitive cardinal number, neutral for number (two's, 100's) |
| MCMC | hyphenated number (40-50, 1770-1827) |
| MD | ordinal number (e.g. first, second, next, last) |
| MF | fraction,neutral for number (e.g. quarters, two-thirds) |
| ND1 | singular noun of direction (e.g. north, southeast) |
| NN | common noun, neutral for number (e.g. sheep, cod, headquarters) |
| NN1 | singular common noun (e.g. book, girl) |
| NN2 | plural common noun (e.g. books, girls) |
| NNA | following noun of title (e.g. M.A.) |
| NNB | preceding noun of title (e.g. Mr., Prof.) |
| NNL1 | singular locative noun (e.g. Island, Street) |
| NNL2 | plural locative noun (e.g. Islands, Streets) |
| NNO | numeral noun, neutral for number (e.g. dozen, hundred) |
| NNO2 | numeral noun, plural (e.g. hundreds, thousands) |
| NNT1 | temporal noun, singular (e.g. day, week, year) |
| NNT2 | temporal noun, plural (e.g. days, weeks, years) |
| NNU | unit of measurement, neutral for number (e.g. in, cc) |
| NNU1 | singular unit of measurement (e.g. inch, centimetre) |
| NNU2 | plural unit of measurement (e.g. ins., feet) |
| NP | proper noun, neutral for number (e.g. IBM, Andes) |
| NP1 | singular proper noun (e.g. London, Jane, Frederick) |
| NP2 | plural proper noun (e.g. Browns, Reagans, Koreas) |
| NPD1 | singular weekday noun (e.g. Sunday) |
| NPD2 | plural weekday noun (e.g. Sundays) |
| NPM1 | singular month noun (e.g. October) |
| NPM2 | plural month noun (e.g. Octobers) |
| PN | indefinite pronoun, neutral for number (none) |
| PN1 | indefinite pronoun, singular (e.g. anyone, everything, nobody, one) |
| PNQO | objective wh-pronoun (whom) |
| PNQS | subjective wh-pronoun (who) |
| PNQV | wh-ever pronoun (whoever) |
| PNX1 | reflexive indefinite pronoun (oneself) |
| PPGE | nominal possessive personal pronoun (e.g. mine, yours) |
| PPH1 | 3rd person sing. neuter personal pronoun (it) |
| PPHO1 | 3rd person sing. objective personal pronoun (him, her) |
| PPHO2 | 3rd person plural objective personal pronoun (them) |
| PPHS1 | 3rd person sing. subjective personal pronoun (he, she) |
| PPHS2 | 3rd person plural subjective personal pronoun (they) |
| PPIO1 | 1st person sing. objective personal pronoun (me) |
| PPIO2 | 1st person plural objective personal pronoun (us) |
| PPIS1 | 1st person sing. subjective personal pronoun (I) |
| PPIS2 | 1st person plural subjective personal pronoun (we) |
| PPX1 | singular reflexive personal pronoun (e.g. yourself, itself) |

-continued

| | |
|---|---|
| PPX2 | plural reflexive personal pronoun (e.g. yourselves, themselves) |
| PPY | 2nd person personal pronoun (you) |
| RA | adverb, after nominal head (e.g. else, galore) |
| REX | adverb introducing appositional constructions (namely, e.g.) |
| RG | degree adverb (very, so, too) |
| RGQ | wh- degree adverb (how) |
| RGQV | wh-ever degree adverb (however) |
| RGR | comparative degree adverb (more, less) |
| RGT | superlative degree adverb (most, least) |
| RL | locative adverb (e.g. alongside, forward) |
| RP | prep. adverb, particle (e.g about, in) |
| RPK | prep. adv., catenative (about in be about to) |
| RR | general adverb |
| RRQ | wh- general adverb (where, when, why, how) |
| RRQV | wh-ever general adverb (wherever, whenever) |
| RRR | comparative general adverb (e.g. better, longer) |
| RRT | superlative general adverb (e.g. best, longest) |
| RT | quasi-nominal adverb of time (e.g. now, tomorrow) |
| TO | infinitive marker (to) |
| UH | interjection (e.g. oh, yes, um) |
| VB0 | be, base form (finite i.e. imperative, subjunctive) |
| VBDR | were |
| VBDZ | was |
| VBG | being |
| VBI | be, infinitive (To be or not. . . It will be . . .) |
| VBM | am |
| VBN | been |
| VBR | are |
| VBZ | is |
| VDO | do, base form (finite) |
| VDD | did |
| VDG | doing |
| VDI | do, infinitive (I may do. . . To do. . .) |
| VDN | done |
| VDZ | does |
| VHO | have, base form (finite) |
| VHD | had (past tense) |
| VHG | having |
| VHI | have, infinitive |
| VHN | had (past participle) |
| VHZ | has |
| VM | modal auxiliary (can, will, would, etc.) |
| VMK | modal catenative (ought, used) |
| VVO | base form of lexical verb (e.g. give, work) |
| VVD | past tense of lexical verb (e.g. gave, worked) |
| VVG | -ing participle of lexical verb (e.g. giving, working) |
| VVGK | -ing participle catenative (going in be going to) |
| VVI | infinitive (e.g. to give. . . It will work. . .) |
| VVN | past participle of lexical verb (e.g. given, worked) |
| VVNK | past participle catenative (e.g. bound in be bound to) |
| VVZ | -s form of lexical verb (e.g. gives, works) |
| XX | not, n't |
| ZZ1 | singular letter of the alphabet (e.g. A,b) |
| ZZ2 | plural letter of the alphabet (e.g. As, b's) |
| NOTE: | "DITTO TAGS" |

Any of the tags listed above may in theory be modified by the addition of a pair of numbers to it: eg. DD21, DD22 This signifies that the tag occurs as part of a sequence of similar tags, representing a sequence of words which for grammatical purposes are treated as a single unit. For example the expression in terms of is treated as a single preposition, receiving the tags:

in_1131 terms_1132 of_1133

The first of the two digits indicates the number of words/tags in the sequence, and the second digit the position of each word within that sequence.

Such ditto tags are not included in the lexicon, but are assigned automatically by a program called IDIOMTAG which looks for a range of multi-word sequences included in the idiomlist. The following sample entries from the idiomlist show that syntactic ambiguity is taken into account, and also that, depending on the context, ditto tags may or may not be required for a particular word sequence:

at_RR21 length_RR22 a_DD21/RR21 lot_DD22/RR22 in_CS21/II that_CS22/DD1

Appendix

Penn Treebank tagset (https://www.sketchengine.eu/penn-treebank-tagset/)

English Penn Treebank part-of-speech tagset is available in English corpora annotated by the tool TreeTagger that was developed by Helmut Schmid in the TC project at the Institute for Computational Linguistics of the University of Stuttgart and containing modifications developed by Sketch Engine (older version).

This version is the older TreeTagger POS tagset. See the most recent English TreeTagger POS tagset pipeline, version 2 in Sketch Engine.

English tagsets used in Sketch Engine

The following table shows English Penn TreeBank part-of-speech tagset including Sketch Engine differences (older version).

An Example of a tag in the CQL concordance search box: [tag="NNS"] finds all nouns in plural, e.g. people, years (note: please make sure that you use straight double quotation marks)

| POS Tag | Description | Example |
| --- | --- | --- |
| CC | coordinating conjunction | and |
| CD | cardinal number | 1, third |
| DT | determiner | the |
| EX | existential there | there is |
| FW | foreign word | les |
| IN | preposition, subordinating conjunction | in, of, like |
| IN/that | that as subordinator | that |
| JJ | adjective | green |
| JJR | adjective, comparative | greener |
| JJS | adjective, superlative | greenest |
| LS | list marker | 1) |
| MD | modal | could, will |
| NN | noun, singular or mass | table |
| NNS | noun plural | tables |
| NP | proper noun, singular | John |
| NPS | proper noun, plural | Vikings |
| PDT | predeterminer | both the boys |
| POS | possessive ending | friend's |
| PP | personal pronoun | I, he, it |
| PP$ | possessive pronoun | my, his |
| RB | adverb | however, usually, naturally, here, good |
| RBR | adverb, comparative | better |
| RBS | adverb, superlative | best |
| RP | particle | give up |
| SENT | Sentence-break punctuation | . ! ? |
| SYM | Symbol | / [ = * |
| TO | infinitive 'to' | togo |
| UH | interjection | uhhuhhuhh |
| VB | verb be, base form | be |
| VBD | verb be, past tense | was, were |
| VBG | verb be, gerund/present participle | being |
| VBN | verb be, past participle | been |
| VBP | verb be, sing. present, non-3d | am, are |
| VBZ | verb be, 3rd person sing. present | is |
| VH | verb have, base form | have |
| VHD | verb have, past tense | had |
| VHG | verb have, gerund/present participle | having |
| VHN | verb have, past participle | had |
| VHP | verb have, sing. present, non-3d | have |
| VHZ | verb have, 3rd person sing. present | has |
| VV | verb, base form | take |
| VVD | verb, past tense | took |
| VVG | verb, gerund/present participle | taking |
| VVN | verb, past participle | taken |
| VVP | verb, sing. present, non-3d | take |
| VVZ | verb, 3rd person sing. present | takes |
| WDT | wh-determiner | which |
| WP | wh-pronoun | who, what |
| WP$ | possessive wh-pronoun | whose |
| WRB | wh-abverb | where, when |
| # | # | # |
| $ | $ | $ |
| " | Quotation marks | ' " |
| " | Opening quotation marks | ` `` |
| ( | Opening brackets | ( { |
| ) | Closing brackets | ) } |
| , | Comma | , |
| : | Punctuation | - ; : — ... |

Appendix

German language tagset (http://www.ims.uni-stuttgart.de/forschung/ressourcen/lexika/TagSets/stts-table.html)

STTS Tag Table (1995/1999)

| POS | DESCRIPTION | EXAMPLES |
| --- | --- | --- |
| ADJA | attributives Adjektiv | [das] große [Haus] |
| ADJD | adverbiales oder prädikatives Adjektiv | [er fährt] schnell, [er ist] schnell |
| ADV | Adverb | schon, bald, doch |
| APPR | Präposition; Zirkumposition links | in [der Stadt], ohne [mich] |
| APPRART | Präposition mit Artikel | im [Haus], zur [Sache] |
| APPO | Postposition | [ihm] zufolge, [der Sache] wegen |
| APZR | Zirkumposition rechts | [von jetzt] an |
| ART | bestimmter oder unbestimmter Artikel | der, die, das, em, eine |
| CARD | Kardinalzahl | zwei [Männer], [im Jahre] 1994 |
| FM | Fremdsprachliches Material | [Er hat das mit "] A big fish [" übersetzt] |
| ITJ | Interjektion | mhm, ach, tja |
| KOUI | unterordnende Konjunktion mit "zu" und Infinitiv | um [zu leben], anstatt [zu fragen] |
| KOUS | unterordnende Konjunktion mit Satz | well, dass, damit, wenn, ob |
| KON | nebenordnende Konjunktion | und, oder, aber |
| KOKOM | Vergleichskonjunktion | als, wie |
| NN | normales Nomen | Tisch, Herr, [das] Reisen |
| NE | Eigennamen | Hans, Hamburg, HSV |
| PDS | substituierendes Demonstrativpronomen | dieser, jener |
| PDAT | attribuierendes Demonstrativpronomenjener | [Mensch] |
| PIS | substituierendes Indefinitpronomen | keiner, viele, man, niemand |
| PIAT | attribuierendes Indefinitpronomen ohne Determiner | kein [Mensch], irgendein [Glas] |
| PIDAT | attribuierendes Indefinitpronomen mit Determiner | [em] wenig [Wasser], [die] beiden [Brüder] |
| PPER | irreflexives Personalpronomen | ich, er, ihm, mich, dir |
| PPOSS | substituierendes Possessivpronomen | meins, deiner |
| PPOSAT | attribuierendes Possessivpronomen | mein [Buch], deine [Mutter] |
| PRELS | substituierendes Relativpronomen | [der Hund ,] der |
| PRELAT | attribuierendes Relativpronomen | [der Mann ,] dessen [Hund] |
| PRF | reflexives Personalpronomen | sich, einander, dich, mir |
| PWS | substituierendes Interrogativpronomen | wer, was |
| PWAT | attribuierendes Interrogativpronomen | welche[Farbe], wessen [Hut] |

STTS Tag Table (1995/1999)

| POS | DESCRIPTION | EXAMPLES |
| --- | --- | --- |
| PWAV | adverbiales Interrogativ- oder Relativpronomen | warum, wo, wann, worüber, wobei |
| PAV | Pronominaladverb | dafür, dabei, deswegen, trotzdem |
| PTKZU | "zu" vor Infinitiv | zu [gehen] |
| PTKNEG | Negationspartikel | nicht |
| PTKVZ | abgetrennter Verbzusatz | [er kommt] an, [er fährt] rad |
| PTKANT | Antwortpartikel | ja, nein, danke, bitte |
| PTKA | Partikel bei Adjektiv oder Adverb | am [schönsten], zu [schnell] |
| TRUNC | Kompositions-Erstglied | An- [und Abreise] |
| VVFIN | finites Verb, voll | [du] gehst, [wir] kommen [an] |
| VVIMP | Imperativ, voll | komm [!] |
| VVINF | Infinitiv, voll | gehen, ankommen |
| VVIZU | Infinitiv mit "zu", voll | anzukommen, loszulassen |
| VVPP | Partizip Perfekt, voll | gegangen, angekommen |
| VAFIN | finites Verb, aux | [du] bist, [wir] werden |
| VAIMP | Imperativ, aux | sei [ruhig !] |
| VAINF | Infinitiv, aux | werden, sein |
| VAPP | Partizip Perfekt, aux | gewesen |
| VMFIN | finites Verb, modal | dürfen |
| VMINF | Infinitiv, modal | wollen |
| VMPP | Partizip Perfekt, modal | gekonnt, [er hat gehen] können |
| XY | Nichtwort, Sonderzeichen enthaltend | 3:7, H2O, D2XW3 |
| $, | Komma | , |
| $. | Satzbeendende Interpunktion | . ? ! ; : |
| $( | sonstige Satzzeichen; satzintern | - [,]( ) |

We claim:

1. In a computer-based system comprising a processor in electrical communication with a memory, the memory adapted to store data and instructions for executing by the processor, a neural paraphrase generator comprising:
   an input adapted to receive a sequence of tuples ($t=(t_1, \ldots, t_n)$) comprising a source sequence of words, each tuple ($t_i=(w_i,p_i)$) comprising a word data element ($w_i$) and a structured tag element ($p_i$), the structured tag element representing a linguistic attribute about the word data element;
   a recurrent neural network (RNN) comprising an encoder and a decoder, wherein the encoder is adapted to receive a sequence of vectors representing a source sequence of words, and the decoder is adapted to predict a probability of a target sequence of words representing a target output sentence based on a recurrent state in the decoder, a set of previous words and a context vector;
   an input composition component connected to the input and comprising a word embedding matrix and a tag embedding matrix, the input composition component being adapted to receive and transform the input sequence of tuples into a sequence of vectors by 1) mapping the word data elements to the word embedding matrix to generate word vectors, 2) mapping the structured tag elements to the tag embedding matrix to generate tag vectors, and 3) respectively concatenating together the word vectors and the tag vectors; and
   an output decomposition component connected to the decoder and adapted to output a target sequence of tuples representing predicted words and structured tag elements, wherein the probability of each single tuple from the output target sequence of tuples is predicted based on a recurrent state of the decoder.

2. The neural paraphrase generator of claim 1 further comprising an attention module adapted to generate a custom context vector for each prediction based at least in part on an attention function.

3. The neural paraphrase generator of claim 2 wherein the attention module is further adapted to generate an attentional vector by concatenating the decoder state and the context vector.

4. The neural paraphrase generator of claim 3 wherein the attentional vector is passed through a softmax layer to produce a probability distribution over a word vocabulary data set.

5. The neural paraphrase generator of claim 1 wherein the word embedding matrix and the tag embedding matrix are populated with pretrained values.

6. The neural paraphrase generator of claim 1 wherein the structured tag element is a part-of-speech tag.

7. The neural paraphrase generator of claim 1 further comprising a loss function adapted to learn to predict tuples of words and structured tags and comprising a custom objective function that jointly considers word and structured tag predictions.

8. The neural paraphrase generator of claim 7, wherein the custom objective function $J_t$ is formulated as follows:

$$J_t = \sum_{\mathbb{D}} -\log p(\hat{t}|t) = \sum_{\mathbb{D}} -(\log p(\hat{w}|w) + \log p(\hat{p}|p))$$

$$\log p(\hat{w}|w) = \sum_{j=1}^{m} \log p(\hat{w}_j|(\hat{t}_1, \ldots, t_{j-1}), y_j)$$

$$\log p(\hat{p}|p) = \sum_{j=1}^{m} \log p(\hat{p}_j|(\hat{t}_1, \ldots, t_{j-1}), y_j)$$

where $\mathbb{D}$ is the parallel training corpus of source tuples (i.e., t), composed of aligned sequences of source words (i.e., w) and source POS tags (i.e., p), and target tuples (i.e., $\hat{t}$), composed of aligned sequences of target words (i.e., $\hat{w}$) and target POS tags (i.e., $\hat{p}$).

9. The neural paraphrase generator of claim 1, wherein the RNN includes Long Short Term Memory (LSTM) cells.

10. The neural paraphrase generator of claim 1 further comprising at least one additional linguistic attribute in addition to the structured tag.

11. A method of using part-of-speech (POS) tagging for taxonomy augmentation, the method performed by a computer-based system comprising a processor in electrical communication with a memory, the memory adapted to store data and instructions for executing by the processor, and a neural paraphrase generator, the method comprising:

receiving, at an input, a sequence of tuples ($t=(t_1, \ldots, t_n)$) comprising a source sequence of words, each tuple ($t_i=(w_i,p_i)$) comprising a word data element ($w_i$) and a structured tag element ($p_i$), the structured tag element representing a linguistic attribute about the word data element;

receiving, by an encoder of a recurrent neural network (RNN), a sequence of vectors representing a source sequence of words, and predicting, by a decoder of the recurrent neural network (RNN), a probability of a target sequence of words representing a target output sentence based on a recurrent state in the decoder, a set of previous words, and a context vector;

receiving and transforming, by an input composition component, the input sequence of tuples into a sequence of vectors by 1) mapping the word data elements to a word embedding matrix to generate word vectors, 2) mapping the structured tag elements to a tag embedding matrix to generate tag vectors, and 3) respectively concatenating together the word vectors and the tag vectors; and outputting, by an output decomposition component connected to the decoder, a target sequence of tuples representing predicted words and structured tag elements, wherein the probability of each single tuple from the output target sequence of tuples is predicted based on a recurrent state of the decoder.

12. The method of claim 11 further comprising generating, by an attention module, a custom context vector based at least in part on an attention function.

13. The method of claim 12 further comprising generating, by the attention module, an attentional vector by concatenating the decoder state and the context vector.

14. The method of claim 13 further comprising passing the attentional vector through a softmax layer to produce a probability distribution over a word vocabulary data set.

15. The method of claim 11 wherein the word embedding matrix and the tag embedding matrix are populated with pretrained values.

16. The method of claim 11 wherein the structured tag element is a part-of-speech (POS) tag.

17. The method of claim 11 further comprising predicting tuples of words and structured tags, by execution of a loss function adapted to learn and comprising a custom objective function that jointly considers word and structured tag predictions.

18. The method of claim 17, wherein the custom objective function $J_t$ is formulated as follows:

$$J_t = \sum_{\mathbb{D}} -\log p(\hat{t} \mid t) = \sum_{\mathbb{D}} -(\log p(\hat{w} \mid w) + \log p(\hat{p} \mid p))$$

$$\log p(\hat{w} \mid w) = \sum_{j=1}^{m} \log p(\hat{w}_j \mid (\hat{t}_1, \ldots, \hat{t}_{j-1}), y_j)$$

$$\log p(\hat{p} \mid p) = \sum_{j=1}^{m} \log p(\hat{p}_j \mid (\hat{t}_1, \ldots, \hat{t}_{j-1}), y_j)$$

where $\mathbb{D}$ is the parallel training corpus of source tuples (i.e., t), composed of aligned sequences of source words (i.e., w) and source POS tags (i.e., p), and target tuples (i.e., $\hat{t}$), composed of aligned sequences of target words (i.e., $\hat{w}$) and target POS tags (i.e., $\hat{p}$).

19. The method of claim 11, wherein the RNN includes Long Short Term Memory (LSTM) cells.

20. The method of claim 11, wherein each tuple further comprises at least one additional linguistic attribute in addition to the structured tag.

* * * * *